US012566629B2

(12) United States Patent
Guo et al.

(10) Patent No.: US 12,566,629 B2
(45) Date of Patent: Mar. 3, 2026

(54) SERVER AND A RESOURCE SCHEDULING METHOD FOR USE IN A SERVER

(71) Applicant: City University of Hong Kong, Hong Kong (HK)

(72) Inventors: Chao Guo, Hong Kong (HK); Moshe Zukerman, Hong Kong (HK); Tianjiao Wang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 653 days.

(21) Appl. No.: 17/972,570

(22) Filed: Oct. 24, 2022

(65) Prior Publication Data

US 2024/0192987 A1 Jun. 13, 2024

(51) Int. Cl.
*G06F 9/48* (2006.01)
*G06F 9/50* (2006.01)

(52) U.S. Cl.
CPC .......... *G06F 9/4881* (2013.01); *G06F 9/5027* (2013.01)

(58) Field of Classification Search
CPC .... G06F 9/4881; G06F 9/5027; G06F 9/4843; G06F 9/505
USPC ........................................................ 718/101
See application file for complete search history.

(56) References Cited

U.S. PATENT DOCUMENTS 9,479,451 B1 * 10/2016 Wertheimer ............ H04L 67/60
9,760,527 B2 9/2017 Egi et al.

| 10,841,367 | B2 * | 11/2020 | Bivens | ................ H04L 41/5009 |
| 10,917,321 | B2 | 2/2021 | Schmisseur et al. | |
| 10,936,374 | B2 * | 3/2021 | Bivens | .................. G06F 9/5016 |
| 10,977,085 | B2 * | 4/2021 | Bivens | ...................... G06F 9/48 |
| 11,221,886 | B2 * | 1/2022 | Bivens | ............... G06F 11/3414 |
| 2007/0234363 | A1 * | 10/2007 | Ferrandiz | .................. G06F 9/46 |
| | | | | 718/101 |
| 2013/0297770 | A1 * | 11/2013 | Zhang | ................. H04L 67/1023 |
| | | | | 709/224 |
| 2016/0380921 | A1 * | 12/2016 | Blagodurov | ............ G06F 3/067 |
| | | | | 709/226 |
| 2017/0293537 | A1 * | 10/2017 | Sun | ......................... G06F 11/30 |
| 2018/0150343 | A1 * | 5/2018 | Bernat | .................. G06F 9/4881 |

(Continued)

OTHER PUBLICATIONS

Han, Sangjin et al. "Network Support for Resource Disaggregation in Next-Generation Datacenters." ACM, Nov. 2013, p. 1-7 (Year: 2013).*

(Continued)

*Primary Examiner* — Lewis A Bullock, Jr.
(74) *Attorney, Agent, or Firm* — Idea Intellectual Limited; Sam T. Yip

(57) ABSTRACT

A server and a resource scheduling method for use in a server. The server comprises a plurality of processing modules each having predetermined resources for processing tasks handled by the server, wherein the plurality of processing modules are interconnected by communication links forming a network of processing modules having a Disaggregated Data Centers (DCC) architecture; a DCC hardware monitor arranged to detect hardware information associated with the network of processing modules during an operation of the server, and a task scheduler module arranged to analysis a resource allocation request associated with each respective task and the hardware information, and to facilitate processing of the task by one or more of the processing modules selected based on the analysis.

16 Claims, 8 Drawing Sheets

(56) References Cited

U.S. PATENT DOCUMENTS

| | | | | | |
|---|---|---|---|---|---|
| 2019/0354412 | A1* | 11/2019 | Bivens | | G06F 9/4843 |
| 2021/0117249 | A1* | 4/2021 | Doshi | | G06F 9/5077 |
| 2021/0311798 | A1* | 10/2021 | Desai | | G06F 21/72 |

OTHER PUBLICATIONS

S. Smale, "Global analysis and economics I: Pareto optimum and a generalization of morse theory," in Dynamical systems: Elsevier, 1973, pp. 531-544.

PaloAltoNetworks.com, "What is a data center?" [Online]. Available: https://www.paloaltonetworks.com/cyberpedia/what-is-a-data-center.

S. S. Gill et al., "AI for next generation computing: Emerging trends and future directions," Internet of Things, vol. 19, p. 100514, Aug. 2022.

C. Guo, M. Zukerman, and X. Wang, "A Reliability-Aware Resource Allocation Method in Disaggregated Data Centers." U.S. Appl. No. 17/586,818.

Q. Zhang, Y. Cai, X. Chen, S. Angel, A. Chen, V. Liu, and B. T. Loo, "Understanding the effect of data center resource disaggregation on production dbmss," Proceedings of the VLDB Endowment, vol. 13, No. 9, pp. 1568-1581, May 2020.

G. Zervas, H. Yuan, A. Saljoghei, Q. Chen, and V. Mishra, "Optically disaggregated data centers with minimal remote memory latency: Technologies, architectures, and resource allocation," Journal of Optical Communications and Networking, vol. 10, No. 2, pp. A270-A285, Feb. 2018.

H. M. M. Ali, T. E. El-Gorashi, A. Q. Lawey, and J. M. Elmirghani, "Future energy efficient data centers with disaggregated servers," Journal of Lightwave Technology, vol. 35, No. 24, pp. 5361-5380, 2017.

A. Peters, G. Oikonomou, and G. Zervas, "In compute/memory dynamic packet/circuit switch placement for optically disaggregated data centers," Journal of Optical Communications and Networking, vol. 10, No. 7, pp. B164-B178, Jul. 2018.

Y. Yan et al., "All-optical programmable disaggregated data centre network realized by fpga-based switch and interface card," Journal of Lightwave Technology, vol. 34, No. 8, pp. 1925-1932, Apr. 2016.

S. Angel, M. Nanavati, and S. Sen, "Disaggregation and the application," in Proc. 12th {USENIX} Workshop on Hot Topics in Cloud Computing (HotCloud 20), 2020.

P. X. Gao, A. Narayan, S. Karandikar, J. Carreira, S. Han, R. Agarwal, S. Ratnasamy, and S. Shenker, "Network requirements for resource disaggregation," in Proc. 12th {USENIX} Symposium on Operating Systems Design and Implementation ({OSDI} 16), 2016, pp. 249-264.

A. D. Papaioannou, R. Nejabati, and D. Simeonidou, "The benefits of a disaggregated data centre: A resource allocation approach," in Proc. 2016 IEEE Global Communications Conference (GLOBECOM), 2016, pp. 1-7.

D. Mourtzis, Design and operation of production networks for mass personalization in the era of cloud technology. Elsevier, 2022.

F. Psarommatis, P. A. Dreyfus, and D. Kiritsis, "The role of big data analytics in the context of modeling design and operation of manufacturing systems," in Design and operation of production networks for mass personalization in the era of cloud technology: Elsevier, 2022, pp. 243-275.

X. Sun, N. Ansari, and R. Wang, "Optimizing resource utilization of a data center," IEEE Communications Surveys & Tutorials, vol. 18, No. 4, pp. 2822-2846, Fourthquarter 2016.

L. Yin, J. Luo, and H. Luo, "Tasks scheduling and resource allocation in fog computing based on containers for smart manufacturing," IEEE Transactions on Industrial Informatics, vol. 14, No. 10, pp. 4712-4721, Oct. 2018.

D. Fernández-Cerero, J. A. Troyano, A. Jakobik, and A. Fernandez-Montes, "Machine learning regression to boost scheduling performance in hyper-scale cloud-computing data centres," Journal of King Saud University-Computer and Information Sciences, vol. 34, No. 6, pp. 3191-3203, Jun. 2022.

W. Zhang, R. Yadav, Y.-C. Tian, S. K. K. S. Tyagi, I. A. Eelgendy, and O. Kaiwartya, "Two-phase industrial manufacturing service management for energy efficiency of data centers," IEEE Transactions on Industrial Informatics, 2022.

K. Kaur, S. Garg, G. Kaddoum, E. Bou-Harb, and K.-K. R. Choo, "A big data-enabled consolidated framework for energy efficient software defined data centers in iot setups," IEEE Transactions on Industrial Informatics, vol. 16, No. 4, pp. 2687-2697, Apr. 2020.

N. Kumar, G. S. Aujla, S. Garg, K. Kaur, R. Ranjan, and S. K. Garg, "Renewable energy-based multi-indexed job classification and container management scheme for sustainability of cloud data centers," IEEE Transactions on Industrial Informatics, vol. 15, No. 5, pp. 2947-2957, May 2019.

N. Gholipour, E. Arianyan, and R. Buyya, "A novel energy-aware resource management technique using joint VM and container consolidation approach for green computing in cloud data centers," Simulation Modelling Practice and Theory, vol. 104, p. 102127, Nov. 2020.

Q. Fang, J. Wang, Q. Gong, and M. Song, "Thermal-aware energy management of an HPC data center via two-time-scale control," IEEE Transactions on Industrial Informatics, vol. 13, No. 5, pp. 2260-2269, Oct. 2017.

C. Guo, K. Xu, G. Shen, and M. Zukerman, "Temperature-aware virtual data center embedding to avoid hot spots in data centers," IEEE Transactions on Green Communications and Networking, vol. 5, No. 1, pp. 497-511, 2020.

Y. Shan, Y. Huang, Y. Chen, and Y. Zhang, "LegoOS: A disseminated, distributed {OS} for hardware resource disaggregation," in Proc. Symposium on Operating Systems Design and Implementation, 2018, pp. 69-87.

T. Harvey, "Hype cycle for compute infrastructure, 2021," Gartner, 2021.

A. Moskovsky and P. Lavrenko, "Composable disaggregated environments for HPC workloads," in Proc. CEUR Workshop, 2020, pp. 43-51.

A. S. Al-Harrasi and S. Ali, "Investigating the challenges facing composable/disaggregated infrastructure implementation: A literature review," in Proc. International Arab Conference on Information Technology, 2021, pp. 1-5.

ResearchAndMarkets.com, The worldwide composable infrastructure industry is expected to grow at a CAGR of 21% between 2021 to 2027. Available: https://www.globenewswire.com/news-release/2021/10/13/2313556/28124/en/The-Worldwide-Composable-Infrastructure-Industry-is-Expected-to-Grow-at-a-CAGR-of-21-Between-2021-to-2027.html.

T. Coughlin, "Digital storage and memory," Computer, IEEE, vol. 55, No. 1, pp. 20-29, Jan. 2022.

X. Guo, X. Xue, F. Yan, B. Pan, G. Exarchakos, and N. Calabretta, "Dacon: A reconfigurable application-centric optical network for disaggregated data center infrastructures," Journal of Optical Communications and Networking, vol. 14, No. 1, pp. A69-A80, Jan. 2022.

A. Pagès, F. Agraz, and S. Spadaro, "On the impact of IT resources disaggregation in optically interconnected data centres," in Proc. ECOC, 2019, pp. 1-4.

O. O. Ajibola, T. E. El-Gorashi, and J. M. Elmirghani, "Network topologies for composable data centers," IEEE Access, vol. 9, pp. 120955-120984, Sep. 2021.

Intel.com, "Intel® rack scale design (Intel® RSD) architecture specification (software v2.5)." [Online]. Available: https://www.intel.com/content/www/us/en/architecture-and-technology/rack-scale-design/architecture-spec-v2-5.html.

A. Pagès, R. Serrano, J. Perello, and S. Spadaro, "On the benefits of resource disaggregation for virtual data centre provisioning in optical data centres," Computer Communications, vol. 107, pp. 60-74, Jul. 2017.

X. Guo, F. Yan, G. Exarchakos, X. Xue, B. Pan, and N. Calabretta, "On the workload deployment, resource utilization and operational cost of fast optical switch based rack-scale disaggregated data center network," in Proc. OFC, 2020, pp. 1-3.

(56) References Cited

OTHER PUBLICATIONS

C. Zhang, P. Zhang, S. Zheng, Z. Yang, R. Liu, and K. Huang, "An efficient self-healing architecture for improving the RAS characteristics of RISC-V server and its quantitative evaluation method," IEEE Embedded Systems Letters, to appear, 2022.

C. Guo, X. Wang, G. Shen, S. Bose, J. Xu, and M. Zukerman, "Exploring the benefits of resource disaggregation for service reliability in data centers," IEEE Transactions on Cloud Computing, (to appear).

A. Carbonari and I. Beschasnikh, "Tolerating faults in disaggregated datacenters," in Proc. HotNets Workshop, 2017, pp. 164-170.

O. O. Ajibola, T. E. El-Gorashi, and J. M. Elmirghani, "Energy efficient placement of workloads in composable data center networks," Journal of Lightwave Technology, vol. 39, No. 10, pp. 3037-3063, May 2021.

R. Lin, Y. Cheng, M. De Andrade, L. Wosinska, and J. Chen, "Disaggregated data centers: Challenges and trade-offs," IEEE Communications Magazine, vol. 58, No. 2, pp. 20-26, 2020.

M. Amaral et al., "DRMaestro: Orchestrating disaggregated resources on virtualized data-centers," Journal of Cloud Computing, vol. 10, No. 1, pp. 1-20, Mar. 2021.

L. Ferreira et al., "Optimizing resource availability in composable data center infrastructures," in Proc. Latin-American Symposium on Dependable Computing, 2019, pp. 1-10.

M. Alizadeh and T. Edsall, "On the data path performance of leaf-spine datacenter fabrics," in Proc. IEEE Annual Symposium on High-Performance Interconnects, 2013, pp. 71-74.

B. Cao et al., "Multiobjective 3-D topology optimization of next-generation wireless data center network," IEEE Transactions on Industrial Informatics, vol. 16, No. 5, pp. 3597-3605, May 2019.

C.-S. Li, H. Franke, C. Parris, B. Abali, M. Kesavan, and V. Chang, "Composable architecture for rack scale big data computing,"

Future Generation Computer Systems, vol. 67, pp. 180-193, Feb. 2017.

V. Shrivastav et al., "Shoal: A network architecture for disaggregated racks," in Proc. Symposium on Networked Systems Design and Implementation, 2019, pp. 255-270.

V. Mishra, J. L. Benjamin, and G. Zervas, "MONet: Heterogeneous memory over optical network for large-scale data center resource disaggregation," Journal of Optical Communications and Networking, vol. 13, No. 5, pp. 126-139, May 2021.

Z. Ding, Y.-C. Tian, M. Tang, Y. Li, Y.-G. Wang, and C. Zhou, "Profile-guided three-phase virtual resource management for energy efficiency of data centers," IEEE Transactions on Industrial Electronics, vol. 67, No. 3, pp. 2460-2468, Mar. 2019.

D. Wang, W. Zhang, H. He, and Y.-C. Tian, "Efficient hybrid central processing unit/input-output resource scheduling for virtual machines," IEEE Transactions on Industrial Electronics, vol. 68, No. 3, pp. 2714-2724, Mar. 2021.

L. Liu, Y. Ding, X. Li, H. Wu, and L. Xing, "A container-driven service architecture to minimize the upgrading requirements of user-side smart meters in distribution grids," IEEE Transactions on Industrial Informatics, vol. 18, No. 1, pp. 719-728, Jan. 2021.

D. S. Johnson, A. Demers, J. D. Ullman, M. R. Garey, and R. L. Graham, "Worst-case performance bounds for simple one-dimensional packing algorithms," SIAM Journal on Computing, vol. 3, No. 4, pp. 299-325, Dec. 1974.

B. LeCun, T. Mautor, F. Quessette, and M.-A. Weisser, "Bin packing with fragmentable items: Presentation and approximations," Theoretical Computer Science, vol. 602, pp. 50-59, Oct. 2015.

X. Jia, J. Zhang, B. Yu, X. Qian, Z. Qi, and H. Guan, "GiantVM: A novel distributed hypervisor for resource aggregation with DSM-aware optimizations," ACM Transactions on Architecture and Code Optimization (TACO), vol. 19, No. 2, pp. 1-27, Jun. 2022.

* cited by examiner

SERVER AND A RESOURCE SCHEDULING METHOD FOR USE IN A SERVER

FIELD OF THE INVENTION

The present invention generally relates to a server and a resource scheduling method for use in a server. More specifically, the present invention relates to a reliable resource scheduling method for composable/disaggregated data centers.

BACKGROUND

With the rapid growth of internet technology like big data and cloud/fog/edge computing, vast amounts of data are poured into the data center (DC), imposing a significant burden on data centers. Considerable effort has been made to ease this burden through various aspects, which are for server-based architecture. This architecture has caused significant resource stranding, hindering efficiency improvement.

Hardware disaggregation decouples resources (e.g., processors and memory) from monolithic servers, potentially improving service reliability. For example, DC may be built as a disaggregated DC (DDC), which represents a DC employing hardware disaggregation. In DDCs, hardware components from integrated servers are disaggregated and reassembled to resource pools interconnected through a direct interconnection network fabric.

SUMMARY OF THE INVENTION

In accordance with a first aspect of the invention, there is provided a server comprising a plurality of processing modules each having predetermined resources for processing tasks handled by the server, wherein the plurality of processing modules are interconnected by communication links forming a network of processing modules having a Disaggregated Data Centers (DDC) architecture; a DDC hardware monitor arranged to detect hardware information associated with the network of processing modules during an operation of the server; and a task scheduler module arranged to analysis a resource allocation request associated with each respective task and the hardware information, and to facilitate processing of the task by one or more of the processing modules selected based on the analysis.

In accordance with the first aspect, the hardware information includes topology of the DDC architecture, loading of each of the plurality of processing modules, and information related to failure and/or repairing of the network of processing modules.

In accordance with the first aspect, the task scheduler module is arranged to provide a scheduler decision to the network of processing modules to facilitate processing of the task, wherein the scheduler decision includes a decision of allocating more than one processing module in the network to handle the task based on resource availability of and inter-resource traffic demand among different processing modules involved in handling the task.

In accordance with the first aspect, the task scheduler module is arranged to analysis multiple resource allocation requests in a static scenario where the resource allocation requests arrive and leave at once in batches.

In accordance with the first aspect, the task scheduler module is arranged to analyze the multiple resource allocation requests based on a mixed-integer linear programming (MILP) method.

In accordance with the first aspect, the mixed-integer linear programming (MILP) method includes solving a MILP problem with varied weights in an objective function associated with a single-objective problem with weighted sum, wherein the single-objective problem is converted from a multi-objective problem associated with multiple resource allocation requests in the static scenario.

In accordance with the first aspect, the task scheduler module is arranged to analysis multiple resource allocation requests in a dynamic scenario where the resource allocation requests arrive and leave randomly and sequentially over a predetermined period of time.

In accordance with the first aspect, the task scheduler module comprises a first sub-module arranged to schedule the resource allocation requests arriving in the dynamic scenario, based on the following conditions: accepting the resource allocation request if sufficient resources are available upon arrival of the request; or blocking the resource allocation request such that the request leaves the system without re-attempting; wherein the resources are provided by a single processing module or a group of two or more processing modules involving an inter-resource traffic.

In accordance with the first aspect, the task scheduler module comprises a second sub-module arranged to restore an accepted request being interrupted by hardware failure associated with resources allocated for handling the task, by excluding the processing module with hardware failure from the topology of the DDC architecture, and re-allocating resources for handling the accepted request.

In accordance with the first aspect, each of the plurality of processing modules includes plurality components of different types of resources, and wherein a single task including a request of more than one resource type is arranged to be processed by components of different types of resources in the plurality of processing modules in a disaggregated manner.

In accordance with a second aspect of the invention, there is provided a resource scheduling method for use in a server, comprising the steps of: detecting hardware information associated with a network of processing modules during an operation of the server, wherein the network of processing modules has a Disaggregated Data Centers (DDC) architecture is formed by a plurality of processing modules interconnected by communication links, and each of the plurality of processing modules has predetermined resources for processing tasks handled by the server; analyzing a resource allocation request associated with each respective task and the hardware information; and facilitating processing of the task by one or more of the processing modules selected based on the analysis.

In accordance with the second aspect, the hardware information includes topology of the DDC architecture, loading of each of the plurality of processing modules, and information related to failure and/or repairing of the network of processing modules.

In accordance with the second aspect, the step of facilitating processing of the task by one or more of the processing modules selected based on the analysis comprises the step of providing a scheduler decision to the network of processing, wherein the scheduler decision includes a decision of allocating more than one processing modules in the network to handle the task based on resource availability of and inter-resource traffic demand among different processing modules involved in handling the task.

In accordance with the second aspect, the step of analyzing the resource allocation request associated with each respective task and the hardware information comprises the step of analyzing multiple resource allocation requests in a static scenario where the resource allocation requests arrive and leave at once in batches.

In accordance with the second aspect, the multiple resource allocation requests are analyzed based on a mixed-integer linear programming (MILP) method.

In accordance with the second aspect, the mixed-integer linear programming (MILP) method includes solving a MILP problem with varied weights in an objective function associated with a single-objective problem with weighted sum, wherein the single-objective problem is converted from a multi-objective problem associated with multiple resource allocation requests in the static scenario.

In accordance with the second aspect, the step of analyzing the resource allocation request associated with each respective task and the hardware information comprises the step of analyzing multiple resource allocation requests in a dynamic scenario where the resource allocation requests arrive and leave randomly and sequentially over a predetermined period of time.

In accordance with the second aspect, the step of analyzing the resource allocation request associated with each respective task and the hardware information comprises the step of scheduling the resource allocation requests arriving in the dynamic scenario, based on the following conditions: accepting the resource allocation request if sufficient resources are available upon arrival of the request; or blocking the resource allocation request such that the request leaves the system without re-attempting; wherein the resources are provided by a single processing module or a group of two or more processing modules involving an inter-resource traffic.

In accordance with the second aspect, the step of analyzing the resource allocation request associated with each respective task and the hardware information comprises the step of restoring an accepted request being interrupted by hardware failure associated with resources allocated for handling the task, by excluding the processing module with hardware failure from the topology of the DDC architecture, and re-allocating resources for handling the accepted request.

In accordance with the second aspect, each of the plurality of processing modules includes plurality components of different types of resources, and wherein a single task including a request of more than one resource type is arranged to be processed by components of different types of resources in the plurality of processing modules in a disaggregated manner.

BRIEF DESCRIPTION OF THE DRAWINGS

Embodiments of the invention are described in more details hereinafter with reference to the drawings, in which.

DETAILED DESCRIPTION

Figure 1:
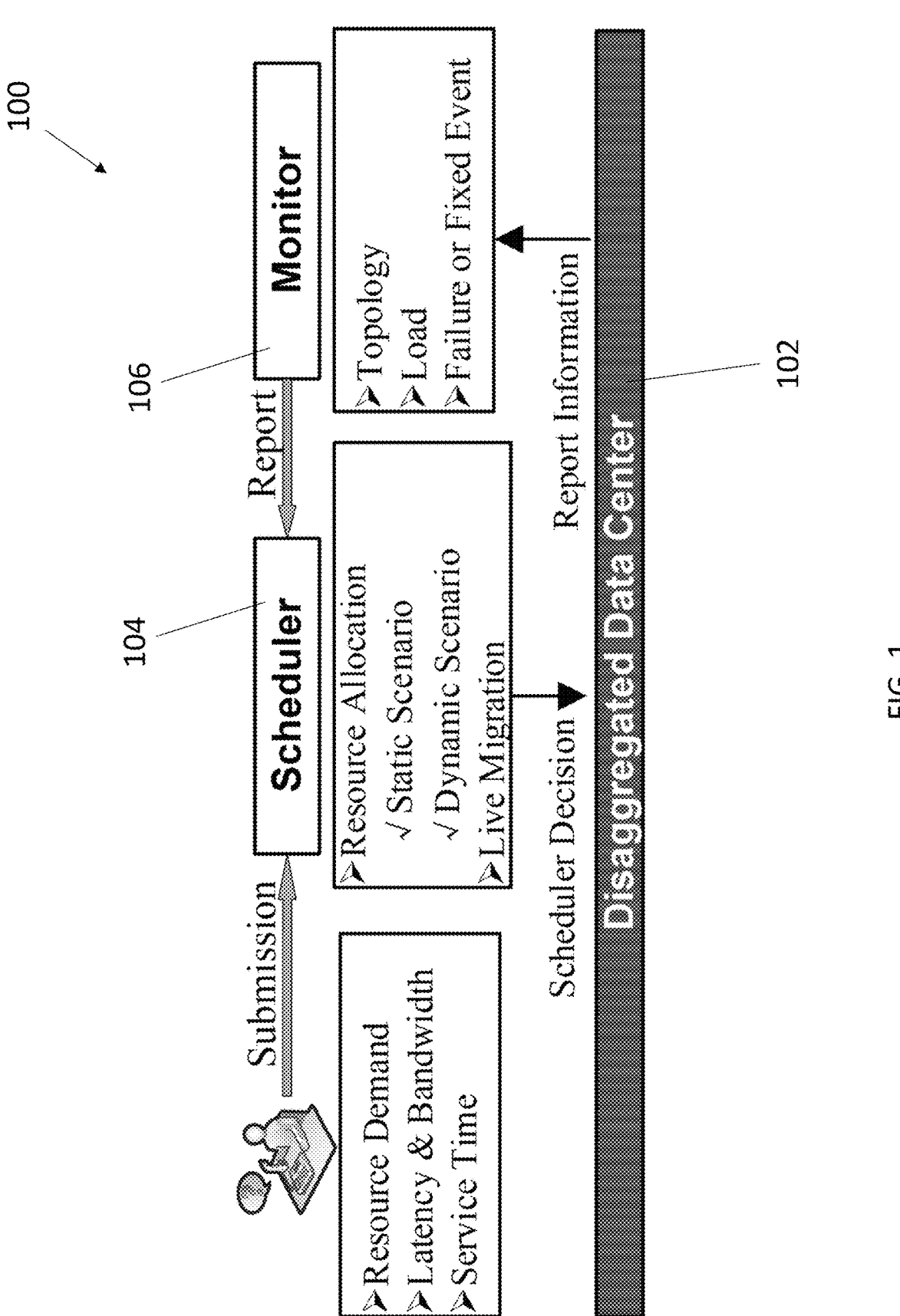
FIG. 1 is an illustration showing a configuration and an operation of the server in accordance with an embodiment of the present invention.

In the following description, a server, a resource scheduling method for use in a server and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The invention designer devised that composable/disaggregated infrastructure (CDI), which "uses an API to create physical systems from shared pools of resources", is an emerging computing infrastructure for future data centers (DCs) to break through the boundary limits of traditional servers. In its current early stage, CDI has grown fast due to its high benefits, which is expected to grow to $13.5 billion by 2027 with an annual growth rate of 21 percent.

This disclosure refers to a CDI-based DC as a disaggregated DC (DDC), which represents a DC employing hardware disaggregation. New techniques like non-volatile memory express, compute express link, computational storage, and the advancement in optical interconnection provide diversified support for communication solutions to hardware disaggregation. DDCs achieve resource efficiency and flexibility by reducing resource stranding in the server-based DC (SDC). Hardware upgrades and resource expansion become cost-efficient since they can be operated at the component level instead of a server level.

In this disclosure, service reliability in DDCs is described. Providing high service reliability is critical for DCs to provide continuous operations, ensuring high quality of services, while unreliable service may lead to severe economic loss. Compared to SDCs, resource availability and reliability in DDCs are potentially improved for two main reasons. Firstly, improved flexibility expands the optimization regions, and secondly, resource decoupling leads to a less harmful failure pattern where failures among different resources may not implicate each other as in SDCs. However, disaggregation may also adversely affect service reliability as resource modules are now directly exposed to a shared network. The failure of the shared network may lead to the unavailability of many resource modules.

In addition, due to the strict latency and bandwidth requirements of inter-resource communications, e.g., CPU-memory communication, the scale of disaggregation is limited. Most efforts on resource disaggregation have considered rack-scale, where a resource, e.g., CPU, can use a different resource, e.g., memory, from the same rack but not from a different rack. Although several publications considered pod/DC-scale disaggregation, their practical application is limited to only a few cases.

In accordance with a first aspect of the present invention, there is provided a server comprising a plurality of processing modules each having predetermined resources for processing tasks handled by the server, wherein the plurality of processing modules are interconnected by communication links forming a network of processing modules having a Disaggregated Data Centers (DDC) architecture; a DDC hardware monitor arranged to detect hardware information associated with the network of processing modules during an operation of the server; and a task scheduler module arranged to analyze a resource allocation request associated with each respective task and the hardware information, and to facilitate processing of the task by one or more of the processing modules selected based on the analysis.

With reference to FIG. 1, there is shown an embodiment of a server 100 comprising a DDC 102, a task scheduler module 104 and a DDC hardware monitor 106. In this disclosure, such configuration may also be referred as a "Radar" framework. The term "Radar" represents reliable resource allocation in disaggregated data centers.

In this example, the server or the Radar framework 100 consists of a scheduler 104, monitor 106, and physical resource modules (e.g. in a DDC 102). The monitor module 106 detects topology and load changes as well as hardware failures and repairs in the DDC 102 and periodically reports the information to the scheduler module 104 to assist in decision-making. The scheduler module 104 executes appropriate algorithms based on the requests and hardware information of the DDC 102 to make a decision and finally sends the decision information to the physical DDC 102 for further operation.

As noted in FIG. 1, the framework 100 addresses both static and dynamic scenarios. As the dynamic scenario is characterized by individual requests that arrive over time, the scheduler assumes that it is a dynamic scenario if the first arrival batch comprises a single request. If the first (and only) batch comprises multiple arrivals, the scheduler assumes it is the static scenario. Detail of resource allocation requests categorized as dynamic scenario or static scenario and the associated allocation policy will be discussed in detail later in this disclosure.

In this example, the task schedular 104 allocate resources for processing one or more tasks based on the hardware loading of the processing modules 102, with reference to the hardware information includes topology of the DDC architecture, loading of each of the plurality of processing modules, and information related to failure and/or repairing of the network of processing modules, which is monitored by the DDC hardware monitoring module 106.

The functional units and modules of the server 100 in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

In this disclosure, the reliability performances in DDCs considering network impact and different disaggregation scales are considered. Therefore, in some embodiments, the invention may contribute to, without limitations:

The problem of reliable resource allocation for DDCs considering network effects and different disaggregation scales are analyzed and evaluated. In addressing this problem, the inventor aimed to achieve both high resource efficiency and high reliability. The inventors consider both static and dynamic scenarios. For the static scenario, the resources are allocated to a batch of known requests. The inventors aim to maximize the reliability of each accepted request and the acceptance ratio, defined as the ratio of the number of accepted requests to the total number of requests. For the dynamic scenario, where requests arrive and depart randomly, resources are allocated to each request upon its arrival and are released at its departure. In addition, hardware failures occur over time, and each failure is fixed after a certain time to repair. Hardware failures interrupt their hosted requests, resulting in the requests failing to complete their service. The objectives in the dynamic scenario are to minimize the blocking probability (one minus the acceptance ratio) and the number of accepted requests failing to complete their service.

The invention may provide mixed-integer linear programming (MILP) formulations to solve the multi-objective problem in the static scenario by converting it into a single-objective problem by the weighted sum approach. The inventors first provide a MILP formulation for a DC-scale DDC and then extend it to MILP formulations for an SDC and a rack/pod-scale DDC. The invention provides approximate Pareto fronts by solving the MILP with varied weights in the objective function.

Radar, a framework for reliable resource allocation in disaggregated data centers, which considers both static and dynamic scenarios, is provided. The inventors provide a heuristic algorithm for the static scenario that can solve the problem at a significantly lower complexity than the MILP. For the dynamic scenario, two heuristic algorithms are provided, with one applied for scheduling the arrival requests, and the other applied when a failure occurs to restore the interrupted requests by migrating them elsewhere.

The inventors also performed extensive simulation studies for the performance analyses. Numerical results demonstrate that the realistically imperfect network may significantly offset the reliability improvement brought by hardware disaggregation under the idealistic resilient assumption. Then, the inventors also demonstrate that backup and/or a migration-based restoration method which may overcome this weakness of disaggregation.

Preferably, the invention may allow one component to be used by multiple requests, and each request comes with a given resource demand, e.g., 10 GB of memory demand, which is different from some example embodiments in which a user requires a specific number of resource components of each type, e.g., the requirement of three CPU chips and two memory modules.

In addition, the inventors also considered different disaggregation scales and studied the impact of a network that is not resilient. They also considered the latency and bandwidth requirement of inter-resource communications. This is different from some other examples which assumes a resilient network and a DC-scale disaggregation in applications, which may be unrealistic, in some examples, a DC-scale DDC may not be able to support some applications because of latency and bandwidth requirement of inter-resource communications.

Figures 2A, 2B:
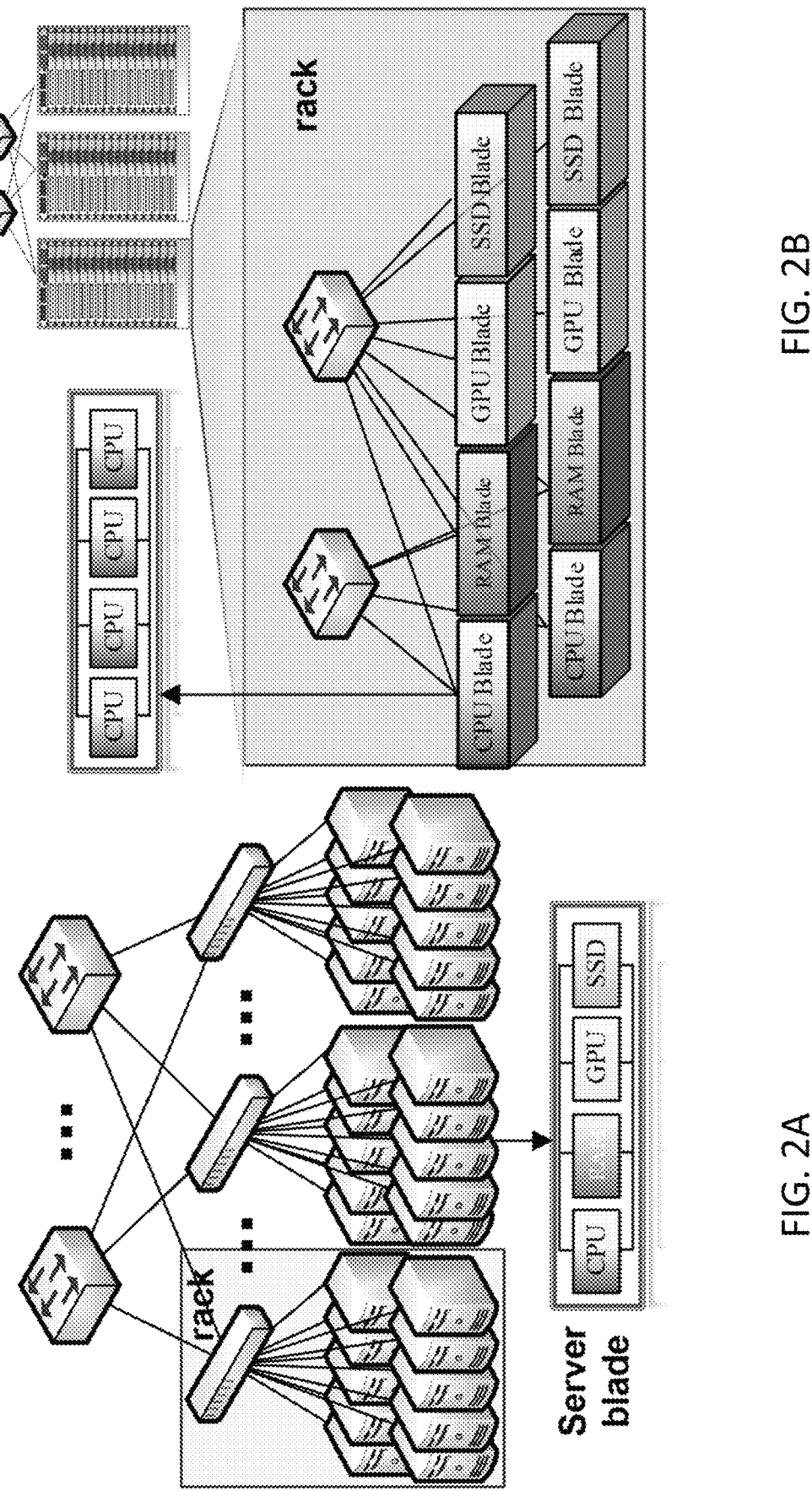
FIG. 2A is an illustration showing an example server-based disaggregated DC architecture.
FIG. 2B is an illustration showing an example rack-scale disaggregated DC architecture.

FIG. 2A illustrates an SDC architecture, where computing and storage resources are packaged in server blades, each containing different resources, and the onboard circuit provides communications among different resources. These servers are interconnected through a DC network (DCN). Traditional DCNs are interconnected through wired links and are organized in a tree-like topology, e.g., leaf-spine topology, like the one shown in FIG. 2A. Recently, wireless communications techniques have also been introduced to reduce the reconfiguration complexity.

FIG. 2B shows a rack-scale DDC architecture, where each blade contains homogeneous resources while a rack also contains heterogeneous resources. A resource, e.g., CPU, can use a different resource, e.g., memory, from the same rack but not from a different rack. In DDCs, communications among different resources are completed through a network. For a DDC with a larger disaggregation scale, e.g., pod- or DC-scale, a rack contains homogeneous resources, and the usage among different types of resources is no longer restricted within a rack but can be across racks and restricted within a pod or DC.

Figures 3, 4:
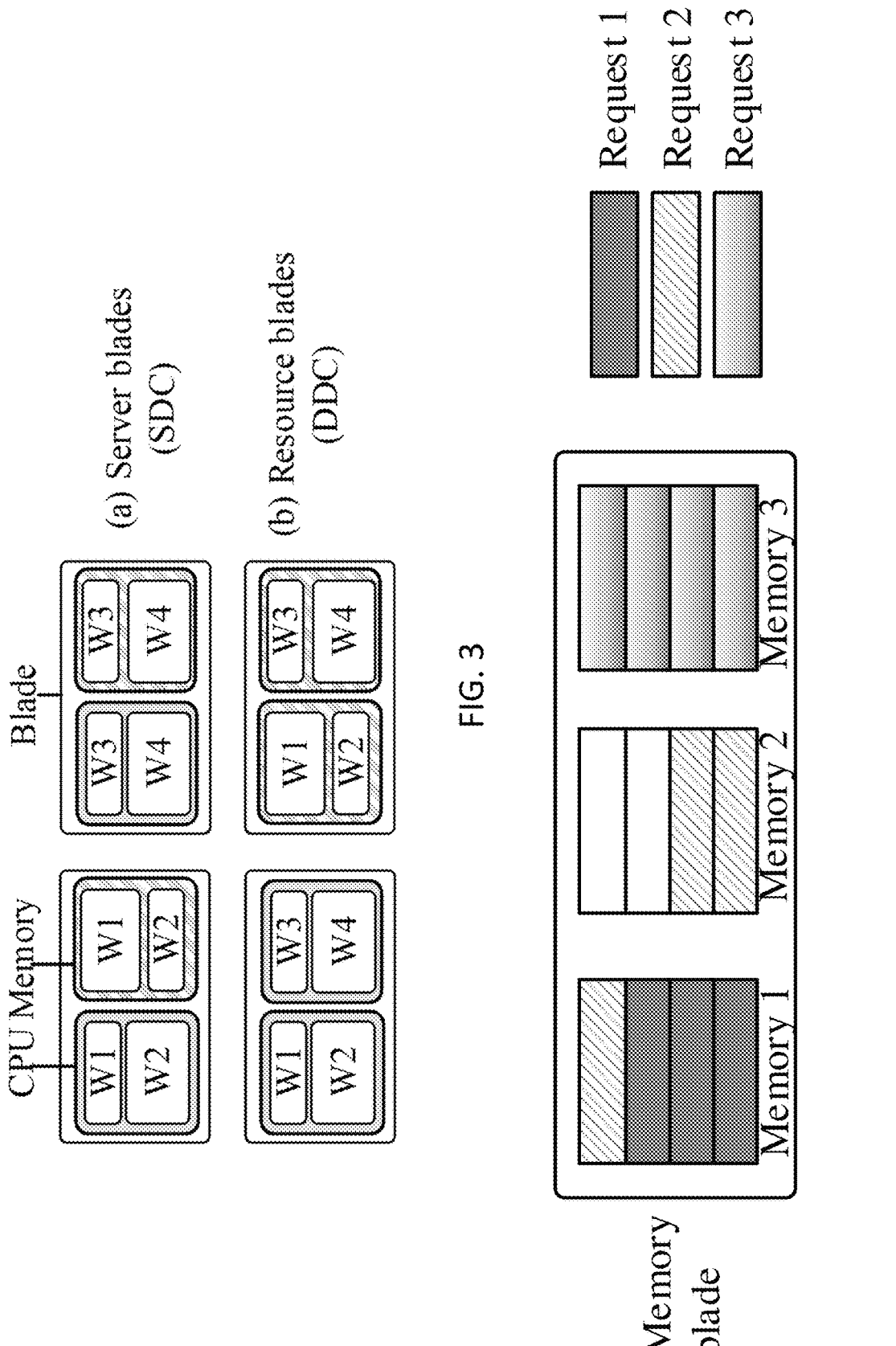
FIG. 3 is an illustration showing placement of four workloads in SDC vs. DDC.
FIG. 4 is an illustration showing three requests on a blade with three memory components, where the three requests arrive in the order of Requests 1, 2, and 3.

Hardware disaggregation has reliability benefits but also challenges. In SDCs, resources in a server blade are interconnected through the motherboard, whose failure affects the blade itself but not other blades. While in a DDC, the failure of the shared network directly affects all the connected components. Also, resource pooling may become a challenge. FIG. 3 shows how the four workloads, W1-W4, are placed in two server blades (upper row in FIG. 3) or two disaggregated resource blades (lower row in FIG. 3). Each workload's CPU and memory demands can be satisfied by one server blade or two disaggregated resource blades. Therefore, each blade in the SDC hosts two workloads but four workloads in the DDC. When one blade fails, all workloads are interrupted in the DDC, but only two are interrupted in the SDC.

To address the problem caused by resource pooling, the inventors may disaggregate the resources thoroughly and make each hardware component a distinct node. However, this method shifts the reliability issue to the network and increases the number of nodes and network scale. A more practical approach is needed through either hardware organization or software scheduling. Next, the inventors provide detailed analyses and possible solutions through a novel resource allocation approach.

The inventors define the problem of resource allocation in DDCs as follows. The inventors are given a DDC as an undirected graph consisting of nodes and links, and the nodes include switches and blades (See FIGS. 2A and 2B). The inventors assume that DDCs employ optical circuit switches because they provide ultra-low and deterministic latency and guaranteed network bandwidth. Each switch is characterized by a switching delay and reliability. Each blade contains a set of components, e.g., CPU components (See FIGS. 2A and 2B), and each component is characterized by its resource type, available capacity, and reliability. The inventors assume that different components in a blade fail independently. Each blade is also associated with delay and reliability, which are the delay between receiving and transmitting data and the reliability of the peripheral elements, such as interfaces and control circuits. Each link is characterized by available bandwidth, propagation delay, and reliability.

The inventors use the term request to represent a possible form of resource allocation requests, including requests for jobs/tasks, virtual machines, and virtual containers. The inventors consider the static and dynamic scenarios of problems regarding whether the requests arrive at once or randomly. Each request arrives with a given service time and a resource demand for each resource type. The request's inter-resource traffic demand and latency requirements are also given.

In addition, the inventors assume that a request can only use one blade for one resource, and the disaggregation scale determines whether it can obtain different resources from different blades. Consider the rack-scale DDC as an example, where a request can only use memory from one blade but obtains different resources from multiple blades within one rack. Some examples regard a blade in a DDC as a single node but does not consider components in the blade. The inventors also consider how the resources from these components are allocated because the inventors need to consider the failure independence among different components. Nevertheless, a request can obtain one resource from multiple components in a blade in a DDC.

Preferably, the scheduler decision includes a decision of allocating more than one processing modules 102 in the network to handle the task based on resource availability of and inter-resource traffic demand among different processing modules 102 involved in handling the task. The problem objectives and methodologies are different in the static and dynamic scenarios.

Preferably, the task scheduler module 104 is arranged to analysis multiple resource allocation requests in a static scenario where the resource allocation requests arrive and leave at once in batches. For example, the task scheduler module 104 may analyze the multiple resource allocation requests based on a mixed-integer linear programming (MILP) method.

In the static scenario, all requests arrive at once. To maximize the acceptance ratio and each request's reliability, the inventors provide a MILP formulation and a scalable heuristic algorithm to address the problem. The MILP formulation translates the problem into precise mathematical language, and it can be solved using commercial solvers to provide optimal solutions. The optimal solutions can be further used to validate the efficiency of the processing.

In addition, the task scheduler module 104 is arranged to analysis multiple resource allocation requests in a dynamic scenario where the resource allocation requests arrive and leave randomly and sequentially over a predetermined period of time.

In the dynamic scenario, requests arrive and leave randomly and sequentially. Preferably, the task scheduler module 104 may comprise a first sub-module arranged to schedule the resource allocation requests arriving in the dynamic scenario, based on different conditions: accepting the resource allocation request if sufficient resources are available upon arrival of the request; or blocking the resource allocation request such that the request leaves the system without re-attempting.

For example, a request is accepted if the available resources in DDC 102 are sufficient upon arrival and blocked otherwise. The inventors assume no waiting room, and a blocked request is rejected and leaves the system without re-attempting. One objective is to minimize the blocking probability (or maximize the acceptance ratio), defined as the ratio of the number of blocked requests to the total number of arrivals during a specified period.

In addition, the task scheduler module 104 comprises a second sub-module arranged to restore an accepted request being interrupted by hardware failure associated with resources allocated for handling the task, by excluding the processing module 102 with hardware failure from the topology of the DDC architecture, and re-allocating resources for handling the accepted request.

For example, an accepted request may be interrupted by a hardware failure in the DDC 102, failing to complete its service. Thus, it may be preferable to minimize the number of accepted requests failing to complete service. The blocking probability does not include the accepted requests interrupted by hardware failures. The inventors provide a Radar framework to achieve the two objectives.

Assume that a request (denoted i) arrives, and denote the arrival and departure times of request i as $t_i^a$ and $t_i^d$, respectively. Also, assume that an element (denoted e) was last repaired at the time $t_e^{LR}$. Let the random variable $\Delta t$ be the time between failures (TBF) of element e. As commonly used, TBF is the time from the moment the element is repaired until it fails again. The probability that e does not fail during the service time of request i (denoted $P_e^i$) can be obtained by:

$$P_e^i = P\left(\Delta t > t_i^d - t_e^{LR} \mid \Delta t > t_i^a - t_e^{LR}\right)$$
$$= \frac{\mathcal{R}_e\left(t_i^d - t_e^{LR}\right)}{\mathcal{R}_e\left(t_i^a - t_e^{LR}\right)}, \qquad (1)$$

where $R_e(t)$ is the reliability of element e, i.e., the probability that the TBF of e is not shorter than t.

The inventors consider the reliability of request i, denoted by $R_i$, as the probability that request t encounters no hardware failure during its service time. This is equal to the probability that no element that serves it fails during its service time. Assuming independence of failures among different elements:

$$\mathcal{R}_i = \prod_{e \in \mathcal{E}_i} P_e^i, \qquad (2)$$

where $\varepsilon_i$ denotes the set of elements used by request i.

The inventors first introduce the MILP for a DDC of DC-scale and later extend it to other scales. Table I provides notations being used.

TABLE I

LIST OF NOTATIONS

| Notation | Explanation |
|---|---|
| R | Set of resource types, e.g., CPU and memory |
| N | Set of blades |
| X | Set of switches |
| $NE_n$ | Set of nodes neighboring to node $n \in N \cup X$ |
| $C_n$ | Set of (resource) components in blade n |
| I | Set of requests |
| $\theta_{nc}^r$ | Binary parameter indicating whether component c in blade n is of resource type $r \in R$ |
| $A_{nc}$ | Available capacity of component c in blade n |
| $B_{mn}$ | Available bandwidth of the link (m, n) |
| $\tau_n^{bld}$ | Delay of blade n |
| $\tau_n^{sw}$ | Switching delay of switch n |
| $\tau_{mn}^{pro}$ | Propagation delay of the link (m, n) |
| $\xi_{mn}^{r_1 r_2}$ | Binary parameter denoting whether the traffic of $(r_1, r_2)$, $r_1, r_2 \in R$ is allowed to traverse the link (m, n) |
| $p_{nc}^i$ | The probability that component c in blade $n \in N$ does not fail during the service time of request i |
| $P_n^i$ | The probability that the blade or switch n does not fail during the service time of request i |
| $P_{mn}^i$ | The probability that link (m, n) does not fail during the service time of request i |
| $D_{ir}$ | Resource demand of request i for resource r |
| $\lambda_{r_1 r_2}^i$ | Traffic demand of resource pair $(r_1, r_2)$ in request i |
| $\Delta\tau_{r_1 r_2}^i$ | Latency requirement of traffic $(r_1, r_2)$ in request t Note, the requirement is for the extra latency traversed the network relative to the onboard latency in a server |
| V | A large value |
| $\alpha$ | A weight factor |

Decision Variables

| Notation | Explanation |
|---|---|
| $\pi_i$ | (Binary) Equal one if request i is accepted; zero otherwise |
| $\delta_n^{ir}$ | (Binary) Equal one if request i gets resource r from the blade n; zero otherwise |
| $\zeta_n^{ir_1 r_2}$ | (Binary) Equal one if request i gets both resources $r_1$ and $r_2$ from blade n; zero otherwise |
| $\mu_{nc}^{ir}$ | (Real) The amount of resource r that request i gets from component c in blade n |
| $\gamma_{mn}^{ir_1 r_2}$ | (Binary) Equal one if the traffic of $(r_1, r_2)$ in request i traverses link (m, n); zero otherwise |
| $\omega_n^{ir_1 r_2}$ | (Binary) Equal one if the traffic of $(r_1, r_2)$ in request i traverses switch n; zero otherwise |
| $\rho_n^i$ | (Binary) Equal one if request i uses switch or blade node n $(n \in N \cup X)$; zero otherwise |
| $\varrho_{cn}^i$ | (Binary) Equal one if request i uses component c in blade n $(n \in N)$; zero otherwise |
| $\chi_{mn}^i$ | (Binary) Equal one if request i uses link (m,n) ; zero, otherwise |
| $\Lambda_i$ | (Real) The logarithm of the reliability of request i, i.e., $\Lambda_i = \log(R_i)$, where $R_i$ is the reliability of the request |
| $\Lambda^{min}$ | (Real) The minimum value of all $\Lambda_i$, $i \in I$ |

The objective is to maximize the weighted sum of the minimum request reliability and acceptance ratio, formulated as:

$$\text{Maximize: } (1 - \alpha) \cdot \frac{\sum_{i \in I} \pi_i}{|I|} + \alpha \cdot \Lambda^{min}. \qquad (3)$$

The decision variables in (3) are defined in Table L. Note that some decision variables in the table are not included in the objective function but are included in the constraints.

Blade and Component Allocation Constraints $$\pi_i = \sum_{n \in N} \delta_n^{ir} \forall\, i \in I, r \in R \qquad (4)$$

$$V \cdot (\cdot \delta)_n^{ir} \geq \mu_{nc}^{ir} \forall\, i \in I, r \in R, n \in N, c \in C_n \qquad (5)$$

-continued $$\delta_n^{ir} \le \nabla \cdot \sum_{c \in C_n} \mu_{nc}^{ir} \forall i \in I, r \in R, n \in N \tag{6}$$

$$\sum_{n \in N, c \in C_n} \mu_{nc}^{ir} = D_{ir} \cdot \pi_i \forall i \in I, r \in R \tag{7}$$

$$\sum_{i \in I} \mu_{nc}^{ir} \le A_{nc} \cdot \theta_{nc}^r \forall n \in N, c \in C_n, r \in R \tag{8}$$

Traffic Scheduling Constraints $$\sum_{i \in I, r_1, r_2 \in R: r_1 \ne r_2} \gamma_{mn}^{ir_1 r_2} \cdot \lambda_{r_1 r_2}^i \le B_{mn} \tag{9}$$
$$\forall m \in N \cup X, n \in NE_m$$

$$\sum_{n \in NE_m} \gamma_{nm}^{ir_1 ir_2} \cdot \lambda_{r_1 r_2}^i - \sum_{n \in NE_m} \gamma_{mn}^{ir_1 r_2} \cdot \lambda_{r_1 r_2}^i = \tag{10}$$
$$\begin{cases} \lambda_{r_1 r_2}^i \cdot (\delta_m^{ir_2} - \delta_m^{ir_1}), & m \in N \\ 0, & m \in X \end{cases} \forall i \in I, r_1, r_2 \in R: r_1 \ne r_2$$

$$\gamma_{mn}^{ir_1 r_2} \le \xi_{mn}^{ir_1 r_2} \forall m \in X \cup N, n \in NE_m, e \in I, r_1, r_2 \in R \tag{11}$$

$$\gamma_{mn}^{ir_1 r_2} = \gamma_{nm}^{ir_2 r_1} \forall i \in I, r_1, r_2 \in R, m \in N \cup X, n \in NE_m \tag{12}$$

$$\gamma_{nm}^{ir_1 r_2} + \gamma_{mn}^{ir_1 r_2} \le 1 \forall i \in I, r_1, r_2 \in R, n \in N \cup X, m \in NE_n \tag{13}$$

$$\omega_n^{ir_1 r_2} \ge \gamma_{mn}^{ir_1 r_2} \forall n \in X, m \in NE_n, i \in I, r_1, r_2 \in R \tag{14}$$

$$\omega_n^{ir_1 r_2} \ge \gamma_{nm}^{ir_1 r_2} \forall n \in X, m \in NE_n i \in I, r_1, r_2 \in R \tag{15}$$

$$\omega_n^{ir_1 r_2} \le \sum_{m \in NE_n} (\gamma_{nm}^{ir_1 r_2} + \gamma_{mn}^{ir_1 r_2}) \forall n \in X, i \in I, \tag{16}$$
$$r_1, r_2 \in R$$

$$\lambda_{r_1 r_2}^i \cdot \left( \begin{array}{c} \sum_{m \in N \cup X, n \in NE_m} \gamma_{mn}^{ir_1 r_2} \cdot \tau_{mn}^{pro} + \sum_{n \in X} \omega_n^{ir_1 r_2} \cdot \tau_n^{sw} + \\ \sum_{n \in N} (\delta_n^{ir_1} + \delta_n^{ir_2} - 2 \cdot \zeta_n^{ir_1 ir_2}) \cdot \tau_n^{bld} \end{array} \right) \le \lambda_{r_1 r_2}^i \cdot \Delta \tau_{r_1 r_2}^i, \tag{17}$$
$$\forall i \in I, r_1, r_2 \in R: r_1 \ne r_2$$

$$\begin{cases} \zeta_n^{ir_1 r_2} \le \delta_n^{ir_1} \\ \zeta_n^{ir_1 r_2} \le \delta_n^{ir_2} \quad \forall n \in N, i \in I, r_1, r_2 \in R \\ \zeta_n^{ir_1 r_2} \ge \delta_n^{ir_1} + \delta_n^{ir_2} - 1 \end{cases} \tag{18}$$

Reliability-Related Constraints $$\Lambda_i = \sum_{n \in N \cup X} \rho_n^i \cdot \log P_n^i + \sum_{n \in N, c \in C_n} \varrho_{nc}^i \cdot \log P_{nc}^i + \tag{19}$$
$$\sum_{m \in N \cup X, n \in NE_m} \chi_{mn}^i \cdot \log P_{mn}^i + (\pi_i - 1) \cdot \nabla \forall i \in I$$

$$\Lambda^{min} \le \pi_i \cdot \Lambda_i + (1 - \pi_i) \cdot \nabla \forall i \in I \tag{20}$$

$$\chi_{mn}^i \ge \gamma_{mn}^{ir_1 r_2} \forall n \in N \cup X, m \in NE_n, i \in I, r_1, r_2 \in R \tag{21}$$

$$\chi_{mn}^i \le \sum_{r_1, r_2 \in R: r_1 \ne r_2} \gamma_{mn}^{ir_1 r_2} \forall n \in N \cup X, m \in NE_n, i \in I \tag{22}$$

$$\rho_n^i \ge \omega_n^{ir_1 r_2} \forall n \in X, i \in I, r_1, r_2 \in R \tag{23}$$

$$\rho_n^i \le \sum_{r_1, r_2 \in R: r_1 \ne r_2} \omega_n^{ir_1 r_2} \forall n \in X, i \in I \tag{24}$$

$$\rho_n^i \ge \delta_n^{ir} \forall n \in N, i \in I, r \in R \tag{25}$$

$$\rho_n^i \le \sum_{r \in R} \delta_n^{ir} \forall n \in N, i \in I \tag{26}$$

$$\varrho_{nc}^i \cdot \nabla \ge \mu_{nc}^{ir} \forall i \in I, r \in R, n \in N, c \in C_n \tag{27}$$

$$\varrho_{nc}^i \le \nabla \cdot \sum_{r \in R} \mu_{nc}^{ir} \forall i \in I, n \in N, c \in C_n. \tag{28}$$

Explanations:

Blade and component allocation constraints: Constraint (4) ensures that every resource that serves a request is from only one blade. Constraints (5) and (6) ensure that a blade is used by request i as long as a component hosted by this blade is used by request i. Constraint (7) ensures that the amount of resources required by an accepted request is equal to the amount of resources allocated to it. Constraint (8) ensures no violation of the component capacity restriction.

Traffic scheduling constraints: Constraint (9) ensures that the link capacity restriction is not violated. Constraint (10) is the flow-conservation constraint for routing the traffic between each resource pair for each request. Constraint (11) ensures that traffic cannot traverse an unpermitted link. This constraint is used for the case when some links are for dedicated communications as required by some architectures. Constraint (12) ensures that the links are bidirectional. Constraint (13) ensures that each traffic stream can only use one direction but cannot use both directions of a link to avoid wastage of communication resources (e.g., creating an unnecessary cycle). Constraints (14)-(16) ensure that a switch is used by a resource pair if any link connected to this switch carries the traffic. Constraint (17) ensures no violation of the traffic latency requirement, where the left-hand side is the traffic latency which is the summation of propagation, switching, and blade delays. The blade delay is $\sum_{n \in N} \tau_n^{bld} \cdot (\delta_m^{ir_1} + \delta_n^{ir_2} - 2 \cdot \zeta_n^{ir_1 r_2})$. Notice that if the source and destination share the same blade, the blade latency equals zero. Constraint (18) ensures that when a blade allocates $r_1$ and $r_2$ to a request, the two resources in the request share the blade.

Reliability-related constraints: Constraint (19) ensures that the reliability of each accepted request is correctly calculated. The last term on the right-hand side of (19) is to avoid the reliability of a rejected request being 1, which may distort output information. Constraint (20) ensures that the minimum reliability (log form) is no larger than that of each accepted request. Constraints (21)-(22) ensure that a link is used by a request when it carries the traffic of the request. Constraints (23)-(24) ensure that a switch node is used by a request when it switches the requested traffic. Constraints (25)-(26) ensure that a blade is used by a request when it provisions resources to this request. Constraints (27)-(28) ensure that a component is used by a request when it provisions resources to this request.

The complexity of both the number of dominant variables ($\gamma_{mn}^{ir_1 r_2}$) and the dominant number of constraints (11) is given by $O(|I| \cdot |R|^2 \cdot |N \cup X|^2)$.

The following constraints are added to extend the DC-scale DDC to a blade-scale DDC.

$$\sum_{n \in N} \rho_n^i = \pi_i \forall i \in I \tag{29}$$

$$\zeta_n^{ir_1 r_2} = \rho_n^i \forall i \in I, r_1, r_2 \in R, n \in N: r_1 \ne r_2 \tag{30}$$

$$\gamma_{mn}^{ir_1 r_2} = 0 \forall i \in I, r_1, r_2 \in R, m \in N \cup X, n \in NE_m \tag{31}$$

$$X_{mn}^i = 0 \forall i \in I, m \in N \cup X, n \in NE_m \tag{32}$$

$$\omega_n^{ir_1 r_2} = 0 \forall i \in I, r_1, r_2 \in R, n \in X: r_1 \ne r_2. \tag{33}$$

Constraint (29) ensures that each accepted request can only use resources from a single blade, and constraint (30) ensures that all the resources required by a request share one blade. Constraint (31) ensures that, in an SDC, each traffic stream does not use network links as it is done locally. Constraints (32)-(33) ensure that an entire request does not use links or switches in an SDC.

Here, a request can only use resources from a single rack (or pod, same below) in a rack-scale DDC but cannot use resources from different racks. Let $\Gamma$ be the set of racks and $\varsigma_{nk}$ be a binary parameter indicating whether the blade n is in rack k. Define a binary variable $\beta_k^i$ that equals one if request i uses blade in rack k; otherwise, zero. The following constraints should be added to extend the MILP for DC-scale DDC to the rack-scale DDC.

$$\Sigma_{k\in\Gamma}\beta_k^i=\pi_i \; \forall i\in I \tag{34}$$

$$\beta_k^i\geq\rho_m^i\cdot\varsigma_{nk} \; \forall i\in I, \; n\in N, \; k\in\Gamma \tag{35}$$

$$\beta_k^i\leq\Sigma_{n\in N}\rho_n^i\cdot\varsigma_{nk} \; \forall i\in I, \; k\in\Gamma. \tag{36}$$

Constraint (34) ensures that each accepted request can only use resources from a single rack. Constraints (35)-(36) ensure that a rack is used by request i as long as request i uses blades in the rack.

The inventors design indices to quantitatively assess the performance of the resource allocation policies, representing preferences when selecting hardware. The inventors consider different disaggregation scales, where the SDC is regarded as a special case of DDC, i.e., a blade-scale DDC.

The policy here is to select a feasible blade with the highest value of a blade index ($\eta\_n^{BS}$) defined as:

$$\eta_n^{BS}=\varepsilon\cdot\eta_n^{rel}+(1-\varepsilon)\cdot\eta_n^{eff} \; \forall n\in N, \tag{37}$$

where $\eta_n^{rel}$ and $\eta_n^{eff}$ are the reliability and efficiency indices associated with blade n, respectively, and $\varepsilon\in[0,1]$ is the weighting coefficient. The reliability index $\eta_n^{rel}$ is the probability that blade n does not fail during the service time of the request, and the efficiency index $\eta_n^{eff}=\overline{U}_n=\Sigma_{r\in R}U_n^r/|R|$, where $U_n^r$ is the utilization of resource r in blade n. The efficiency index is set according to the well-known best-fit (BF) bin-packing scheme, which selects a feasible bin with the least remaining capacity.

Since the rack- and pod-scale DDCs are similar, the inventors next consider only the rack-scale DDC. The allothe utilization of the blade. Since a DDC blade has multiple components of the same resource type, the utilization of the blade is calculated by $\Sigma_{c\in C_n}L_{nc}/\Sigma_{c\in C_n}A_{nc}$, where $L_{nc}$ and $A_{nc}$ are the load and available capacity of component c in blade n, respectively. The reliability index of a blade is $P_n^i\cdot\Pi_{c\in C_n}P_{nc}^i$, where $C_n^i$ is the set of components in blade n used by request i. Note that the reliability index here only considers the components used by the request because components are independent and do not interfere with each other. Overall, the blade index ($\eta_n^{RS}$) is:

$$\eta_n^{RS}=\varepsilon\cdot P_n^i\cdot\prod_{c\in C_n^i}P_{nc}^i+(1-\varepsilon)\cdot\frac{\sum_{c\in C_n}L_{nc}}{\sum_{c\in C_n}A_{nc}}. \tag{38}$$

The rack index is also the weighted sum of a reliability index and an efficiency index. The reliability index of a rack is the request's reliability when allocated with the selected blades in the rack and the required switches and links. The efficiency index is defined as the average utilization of the $|R|$ selected blades in the rack. Finally, the rack (or pod) with the highest rack index is chosen.

The algorithm pseudocode, named ARRIVAL-ALLOC, for allocating resources to a request, is described as follows. It takes two inputs, i.e., the request i and the rack-scale DDC graph G. The algorithm first sorts the resource types in R in descending order of competitive ratio, defined as the ratio of the requested resource amount to the capacity per component for each resource type $r\in R$. This operation prioritizes intensive resources, e.g., for r=CPU, a CPU-intensive request has the largest competitive ratio. If components have different capacities, the denominator of the competitive ratio is the average component capacity.

| ARRIVAL-ALLOC (i, G) | //i - request, G - rack-scale DDC |
|---|---|
| 1:SORT-DES$\left(R, \dfrac{D_{ir}}{capacity\cdot r}\right)$; | // sort R in descending order of $\dfrac{D_{ir}}{capacity\cdot r}$ |
| 2:maxRackIndex = −1; | |
| 3:$\phi_{best}$ = Null; | // initialize the best solution as empty |
| 4:for (k $\in$ $\Gamma$) | |
| 5:for (r $\in$ R) | |
| 6:$L_{kr}^B = \emptyset$; | // storing feasible blades with r in k |
| 7:for (each blade n with resource r in rack k) | |
| 8:if (FRAGMENTABLE-BIN-PAC(n, $D_{ir}$) == TRUE) | |
| 9:$L_{kr}^B$. add(n); | // record feasible blade |
| 0:if ($L_{kr}^B$ == $\emptyset$) | |
| 1:go to line 4; | // no feasible solution, try next rack |
| 2:SORT-DES ($L_{kr}^B$, $\eta_n^{RS}$); | // descending order of blade index |
| 3:$L_k^B = (L_{kr}^B: r \in R)$; | // storing these lists in one set |
| 4:p = 1; | // index the first resource (type) in R |
| 5:$\phi_k$ = Null; | // storing solution in rack k |
| 6:if (BLADE-SELEC-TRAFFIC-SCHED(r, R, $L_k^B$, $\phi_k$) == TRUE) | |
| 7:if (RACK-INDEX($\phi_k$) > maxRackIndex) | |
| 8:max = RACK-INDEX($\phi_k$); | |
| 9:$\phi_{best}$= $\phi_k$; | //update the best solution |
| 0:if ($\phi_{best}$ ≠ Null) | |
| 1:FINAL-ALLOC($\phi_{best}$); | |
| 2:return TRUE; | |
| 3:return FALSE; | | cation in a rack-scale DDC is to select a rack and then choose a blade for each type of resource, which involves rack and blade indices.

Similar to (37), the blade index is also the weighted sum of efficiency and reliability indices. The efficiency index is Subsequently, the algorithm scans the racks to find the best solution, i.e., the rack with the maximum rack index. The variable $\phi_{best}$ in line 3 is a global variable recording the best solution. This variable has a self-defined data structure that records the information on which components, blades, links, and switches are used for providing the resource to request i. The algorithm updates the current optimal solution when a new solution with a higher rack index is found (lines 16-19). The algorithm iterates until all racks are checked, and finally, the one with the highest rack index is selected (line 21).

In a candidate rack and for each resource type, the algorithm filters the blades with sufficient remaining capacity by calling the procedure named FRAGMENTABLE-BIN-PAC (line 8). This procedure addresses the problem of allocating resources from the components in the given blade and outputs TRUE when the blade is feasible to host the request. Afterward, the feasible blades are sorted in descending order of the blade index (line 12) to prioritize those with high blade indices. Next, the algorithm calls the procedure BLADE-SELEC-TRAFFIC-SCHED to find the solution in this rack (line 16), i.e., select blades and schedule the traffic.

This corresponds to the procedure FRAGMENTABLE-BIN-PAC in ARRIVAL-ALLOC. This procedure is based on the algorithm to solve the bin-packing problem where the items are splittable. Here, the item to be packed is the resource demand $D_{ir}$, and the bins are the components in blade n. This procedure operates as follows. Firstly, sort the components in the given blade in decreasing order of $P_{nc}^i$ (a probability term defined in Table I), prioritizing high reliable components. Secondly, try to find out a perfect component, i.e., the component whose remaining capacity is precisely equal to $D_{ir}$. If the perfect component exists (e.g., Request 3 in FIG. 4), assign it to the request and terminate the procedure. Otherwise, check the components one by one. When the remaining capacity of a candidate component is larger than the demand (e.g., Request 1 in FIG. 4), allocate resources from this component. Otherwise, allocate all its remaining capacity to the request and use subsequent components to fulfill the remaining demand (e.g., Request 2 in FIG. 4).

---

BLADE-SELEC-TRAFFIC-SCHED(p, R, $L_k^B$, $\phi_k$)

```
1:r = R[p];
2:L_kr^B = L_k^B. get(r);        // the list of blades of resource r
3:for (n_cur ∈ L_kr^B)
4:if (TRAFFIC-SCHED(φ_k, n_cur) == FALSE)
5:continue;
6:φ_k. add(n_cur);               // record the feasible blade
7:if (p == |R|)                  // this is the last resource (type)
8:return TRUE;
9:else
0:p + +;                         // index the resource (type) next to r
1:res = BLADE-SELEC-TRAFFIC-SCHED(p, R, L_k^B, φ_k)
2:if (res == FALSE)
3:φ_k. remove(n_cur); // failure in resources after r
4:else
5:return TRUE
6:return FALSE
```

This part corresponds to the procedure BLADE-SELEC-TRAFFIC-SCHED in ARRIVAL-ALLOC, and the pseudocode of the procedure, named as "BLADE-SELEC-TRAFFIC-SCHED" is also described here. The general idea of this procedure is as follows. In the beginning, the inventors select a blade for the first resource type ($r_{1st}$). When selecting a blade for the second resource type ($r_{2nd}$), the inventors also try to schedule the traffic ($r_{1st}$, $r_{2nd}$). If the traffic scheduling fails, meaning that this blade is not suitable for $r_{2nd}$, the inventors try the next blade. Similarly, when selecting a blade for the third resource type ($r_{3rd}$), the inventors also need to schedule the traffic ($r_{1st}$,$r_{3r}$) and ($r_{2nd}$,$r_{3rd}$). This process is repeated for each of the remaining resource types.

The procedure takes the input p=1, . . . , |R|, to index the current resource type r, i.e., R[p] is the $p^{th}$ element in R. Note that input R is an ordered set that has been sorted previously (see line 12 in ARRIVAL-ALLOC). The procedure is executed recursively, starting from the first resource type, i.e., p=1. Each time a resource type temporarily determines its host, the procedure goes to the next resource type by incrementing p (line 10). The termination condition is that the procedure finds a feasible blade for the last resource type (lines 7-8).

For a current resource type r indexed by p, the procedure scans blades in L'ir to look for the first blade that satisfies the traffic requirement (line 4). Here, another procedure named TRAFFIC-SCHED is called to schedule the traffic between the current resource type r and the previous resource types $r_{pri}$=R[$p_{pri}$], $p_{pri}$=1, . . . , p-1. If the traffic scheduling succeeds, the procedure temporarily records the current blade $n_{cur}$ as the host for r (line 6), and go for the next resource type $r_{next}$=R[p+1] (line 10). Then, the procedure recursively calls the algorithm itself (line 11) to find a feasible blade for $r_{next}$. If the next resource type could not find a feasible blade satisfying the traffic requirement, it abandons blade $n_{cur}$ (line 13), then tries the next blade for resource type r.

The traffic scheduling procedure TRAFFIC-SCHED searches for a path for each resource pair, which is operated as follows. Firstly, it excludes links with insufficient capacity. Then, it runs the shortest path algorithm with the weight of each link setting as $w_{mn}=\tau_{mn}^{pro}+0.5 \cdot \tau_m+0.5 \cdot \tau_n$, where, $\tau_{mn}^{pro}$, $\tau_m$, and $\tau_n$ are the propagation delay of link (m,n) and the delays at the endpoints m and n, respectively. If the path exists, it further checks whether the latency meets the requirement and schedules the traffic along this path if it does.

Figure 5:
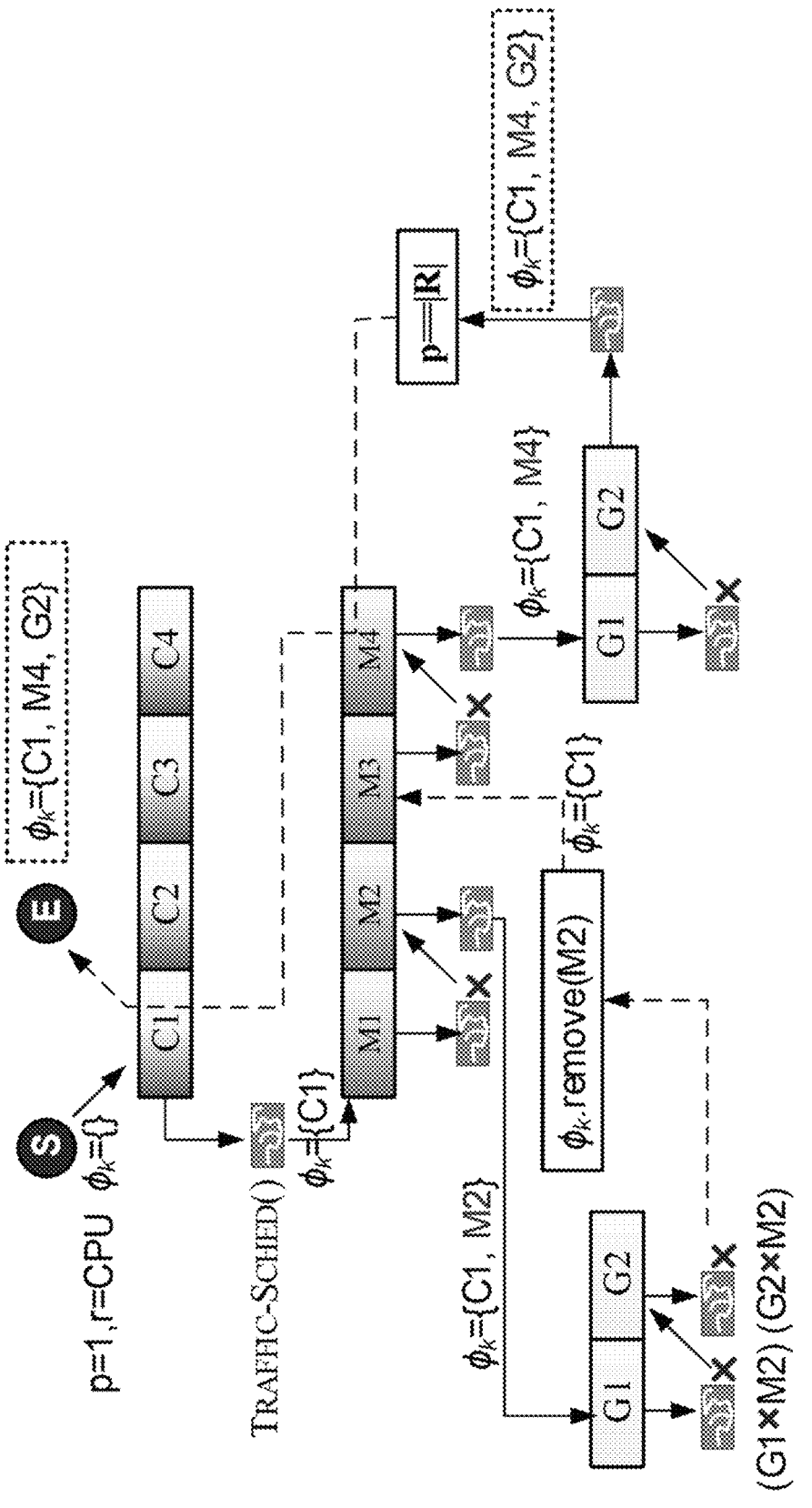
FIG. 5 is a flow diagram showing an example blade selection procedure.

With reference to FIG. 5, there is shown the procedure by an example, which includes three resource types, sorted in the order of CPU, memory, and GPU. As described earlier, the plurality of processing modules includes plurality components of different types of resources, and a single task including a request of more than one resource type may be processed by components of different types of resources in the plurality of processing modules in a disaggregated manner.

It starts from the first resource type, i.e., CPU, and checks whether the first CPU blade (C1) is feasible. As it is the first resource type, there are no previous resource types, so no traffic needs to be scheduled, and C1 is directly recorded as the candidate blade (recorded in Øk). Then, it goes for the second resource type, i.e., memory, and needs to schedule the traffic between memory and CPU. However, selecting M1 as the candidate leads to failure in traffic scheduling, so M1 is not feasible, and M2 is recorded as a temporary host for the memory. When it comes to the last resource type, GPU, the procedure cannot find a feasible blade when scheduling the traffic between memory and GPU. It returns to the memory blade selection step and abandons M2 but tries M3 and M4. Finally, C1, M4, and G2 are selected, and traffic scheduling is also complete.

The inventors first analyze the algorithm's time complexity of the algorithm provided in ARRIVAL-ALLOC. The inventors consider it takes O(n log n) to sort a list with n elements, as many sorting algorithms have this complexity. In addition, the inventors assume the number of resource types and the number of components in each blade are constant. Accordingly, lines 4, 8, and 12 take the time of O(1), $O(|\Gamma| \cdot |N_{kr}|)$, and $O(|\Gamma| \cdot |N_{kr}| \cdot \log |N_{kr}|)$, respectively. Here $|N_{kr}|$ is the number of blades of each resource type per rack. The most time-consuming execution is the blade selection procedure, which is to select one blade for each resource type from a rack. Since the total number of blade combinations is $|N_{kr}|^{|R|}$, the complexity of the blade selection procedure is $O(|N_{kr}|^{|R|})$. Thus, line 16 takes the time of $O(|\Gamma|\cdot|N_{kr}|^{|R|})$. In total, the time complexity of the algorithm is $O(|\Gamma|\cdot|N_{kr}|\cdot\log|N_{kr}|+|\Gamma|\cdot|N_{kr}|^{|R|})$. It is equal to $O(|\Gamma|\cdot|N_{kr}|^{|R|})$ since $|R|>1$. Since $|R|$ has a typical value of 3 to 4, the complexity is very high. Fortunately, the DDC architectures are basically rack-scale, where the base term $|N_{kr}|$ does not have a high value, at most a dozen.

The space complexity of this algorithm is $O(|R|)$. The extra space is needed mainly to recursively call the BLADE-SELEC-TRAFFIC-SCHED procedure.

For this scenario, the inventors introduce the SHUFFLE-AND-UPDATE procedure as follows. Given a set of requests I, the inventors first randomize the order of requests in I, then apply the ARRIVAL-ALLOC algorithm to each request according to the order and calculate the objective function, recorded as $F_m$. Nextly, the inventors set an integer number which the inventors refer to as an epoch size. The inventors then repeat the randomize-and-try to find a better solution, i.e., a solution with the objective $F_1$, and $F_1>F_m$. If a better solution can be found after repeating the random-and-try K times, such that K<epoch size, the inventors update the optimal solution with $F_1$. The inventors call this process one epoch of the SHUFFLE-AND-UPDATE optimization process. The above optimization process is further repeated until no better solution is found in any epoch.

---

MIGRATION-BASED-RESTORATION(e, G)

|  |  |
|---|---|
|  | // e − the failed element |
| 1:$I^{intr}$ = HOSTED-REQUESTS(e); | // get the set of interrupted requests |
| 2:G.remove(e); | // remove failed element from G |
| 3:failNum = 0; | // number of failing restored requests |
| 4:for (i ∈ $I^{intr}$) |  |
| 5:success = ARRIVAL-ALLOC(i, G) |  |
| 6:if (success == FALSE) | // fail migration |
| 7:failNum ++; | // fail to complete service |
| 8:return failNum; |  |

---

In order to reduce the number of accepted requests failing to complete their service, the inventors devised a migration mechanism to restore the interrupted requests. The procedure first excludes the failed element from the DDC graph, then, for each interrupted request, calls the procedure ARRIVAL-ALLOC based on the residual graph and re-allocates resources to this request if it succeeds. It should be noted that the failed element can be repaired and can serve other requests after being repaired.

The implementation of the resource management framework in accordance with embodiments of the invention needs the support of operating systems (OSes) for DDCs, e.g., LegoOS and GiantVM LegoOS is based on a new OS model, named splitkernel, where each resource component maintains an independent manager (or monitor). LegoOS provides the capability that allows an application to use multiple components of the same resource type, which can be combined with the components allocation procedure. In addition, LegoOS provides fault-tolerance mechanisms, which can be combined with the migration-based restoration algorithm to resume the interrupted services. GiantVM is a hypervisor system that can create a VM spanning multiple components and machines (i.e., blades), which may also be used to implement the Radar framework.

The followings present the numerical results for validating the performance of the DDC against the SDC. Both the static scenario and dynamic scenario are considered.

The MILP can only find optimal solutions for small-size problems due to its high computational complexity. The inventors consider only one pod consisting of one spine switch and 3 racks with one leaf switch, 3 blades per rack, and 3 components per blade. Three types of resources are considered: R=(CPU, memory, accelerator), with a per component capacity of 100 units. The age of each hardware element is $U(10^2,10^4)$ time units, where U(a, b) is a random value uniformly distributed within the interval (a, b). Henceforth, the inventors do not add units to simulation time measures, which are understood to be time units. All the requests are assumed to be given at time t=0, and the service time of each request is U(1,100). Four kinds of requests are considered: CPU-intensive, memory-intensive, accelerator-intensive, and random. If request i is of $r_1$-intensive ($r_1 \in R$), i.e., the first three kinds of requests, its demand is set as $$D_{ir} = \begin{cases} U(40, 80), & r = r_1 \\ U(10, 40), & r \neq r_1 \end{cases}.$$

For a random request, its demand is $D_{ir}=U(10,80)$ $\forall r \in R$.

The inventors consider four test cases considering the settings for reliability and network latency/bandwidth, namely, S1-S4. In S1, all hardware elements except the resource components are resilient, and the inventors assume that requests have no latency and bandwidth requirements. Each component's reliability follows the Weibull distribution with scale parameter $\eta_e=10^6$ and shape parameter $\beta_e=U(1,2)$. This setting ensures that the hardware mean TBF (MTBF) is far longer than the request service time by four to five orders of magnitude. S2 is extended from S1, where blades become not resilient, whose reliability also follows the above Weibull distribution. Similarly, S3 is extended from S2, where each switch's reliability also follows the above Weibull distribution. Lastly, S4 further considers the latency constraints based on S3. The inventors set the latency-related parameters as follows. Hardware delays are set as: $\tau_n^{bld}$=U(50,60) ns, $\tau_n^{sw}$=U(100,150) ns, $\tau_{mn}^{pro}$=d× $L_{pro}$, where $L_{pro}$=5 ns/m and d=2m for each intra-rack link while U(10, 30) m for each inter-rack link. The latency requirement for the traffic between CPU and memory is U(500, 900) ns; U(1, 100) μs otherwise.

The inventors use an optimization solver (e.g., AMPL/ Gurobi) to solve the MILP formulations to provide solutions with respect to the objective function (3). The simulation environment for the heuristic algorithms is built through an object-oriented programming language (e.g., Java).

Figure 6:
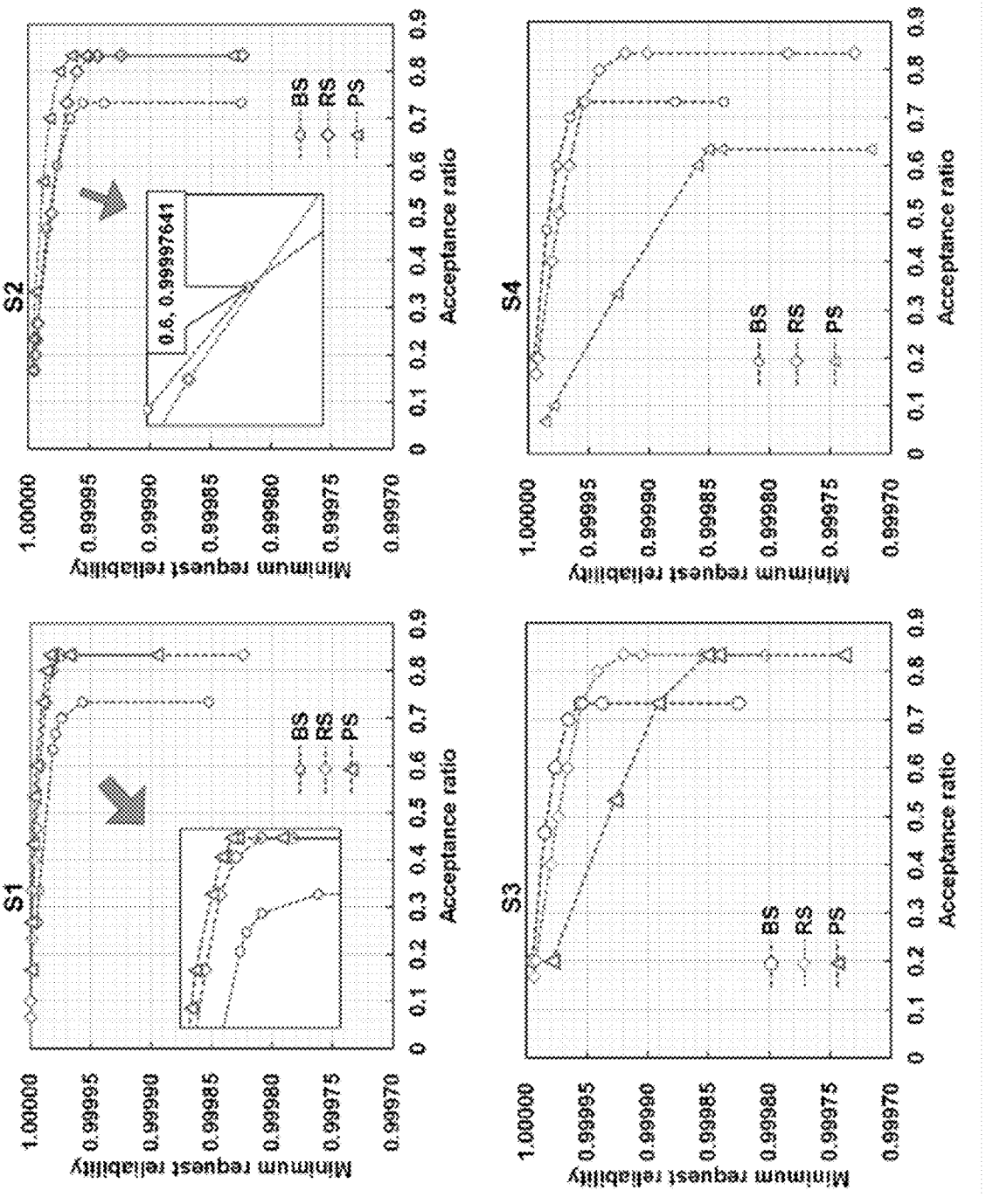
FIG. 6 are plots showing Pareto fronts in terms of minimum request reliability vs. acceptance ratio (obtained by MILP)

The inventors first evaluate the performance of different disaggregation scales using the MILP. FIG. 6 presents the results of the minimum requests reliability vs. the acceptance ratio in S1-S4. Here, the number of requests is 30. In the figure, "BS", "RS", and "PS" correspond to the blade-scale, rack-scale, and pod-scale DDCs, respectively. The inventors use dashed lines to connect the results to approximate the Pareto fronts. Each approximate Pareto front provides a set of optimal solutions in terms of acceptance ratio and minimum request reliability based on given preferences. It is obtained by solving the MILP with varied weight factors. The ordinate intervals in S1-S4 are the same in FIG. 9 so that the differences between the Pareto fronts in S1-S4 can be clearly observed. The inventors observe that PS performs the best in S1 and S2 while performing significantly worse in S3 and S4. This can be explained by the fact that PS has a larger disaggregation scale than RS and BS, so it can achieve higher minimum request reliability and acceptance ratio. However, a request in PS uses more network elements than in BS and RS. Therefore, when the switches are not resilient and latency requirements are considered, the performance of PS sharply decreases.

The inventors also observe that RS performs better than BS in S1, while in S2-S4, the performance of RS drops faster than BS. The reason is as follows. RS has higher flexibility and efficiency than BS, so RS outperforms BS in S1. However, service reliability in RS is significantly influenced by the network, so the performance of RS decreases sharply when blades and switches are not resilient (S2-S3). In S4, the approximate Pareto fronts of RS and BS cross at (0.999955, 0.73). Accordingly, if setting a reliability threshold higher than 0.999955 (corresponding to the left side of the intersection), the acceptance ratio of RS is lower than BS while higher than BS otherwise. This is because requests in RS require more switches and blades than in BS, so their achievable reliability in RS may not be as high as in BS, and more requests in RS will be rejected if the reliability threshold is very high. On the contrary, when relaxing the threshold, the benefits of resource disaggregation manifest, where resource stranding in BS is significantly avoided in RS so that RS can achieve a higher acceptance ratio than BS. Overall, the performance difference of RS and BS on both sides of the intersection again demonstrates that resource disaggregation can improve resource efficiency, while the benefit will be offset if the network is not resilient.

Figure 7:
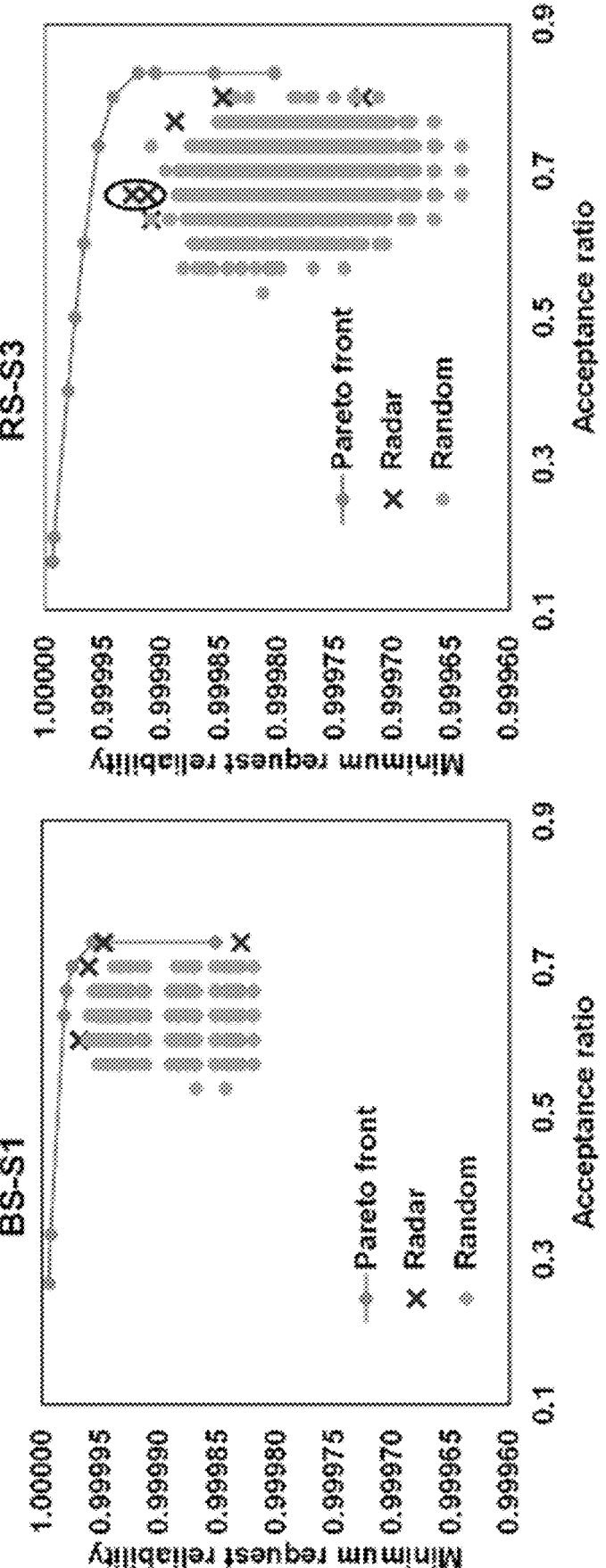
FIG. 7 are plots showing minimum request reliability vs. acceptance ratio obtained by Radar in S1 BS and S3 for RS.

FIG. 7 provides the results of Radar in S1 for BS and S3 for RS, and for comparison, the inventors also show the Pareto fronts and other 10000 random solutions. The results of Radar are obtained with varied weighting coefficients in the blade and rack indices (See Section IV.B). The inventors can observe that Radar performs close to the approximate Pareto fronts and outperforms all random solutions, demonstrating that Radar has high efficiency. In addition, Radar consistently maintains a high acceptance ratio. For example, in RS-S3, the acceptance ratio obtained by Radar is consistently larger than 0.8, also demonstrating its high efficiency. Note that in FIG. 7, the inventors aim to show all the results obtained by Radar and Random, not only the optimal solutions. There are some solutions with the same acceptance ratio but different minimum request reliability obtained by Radar and Random, e.g., the two data points that have been circled in RS-S3. Clearly, having such two solutions, the inventors will not choose the inferior one (the lower of the two). The inventors only aim to illustrate such solutions and explain how they are obtained. This is explained through the $12^{th}$ line of the ARRIVAL-ALLOC algorithm, which is the operation that sorts the blades in descending order of the blade index. Increasing the weighting coefficients of the blade index prioritizes highly reliable blades. However, the acceptance ratio may remain unchanged since the capacity does not change.

Figure 8:
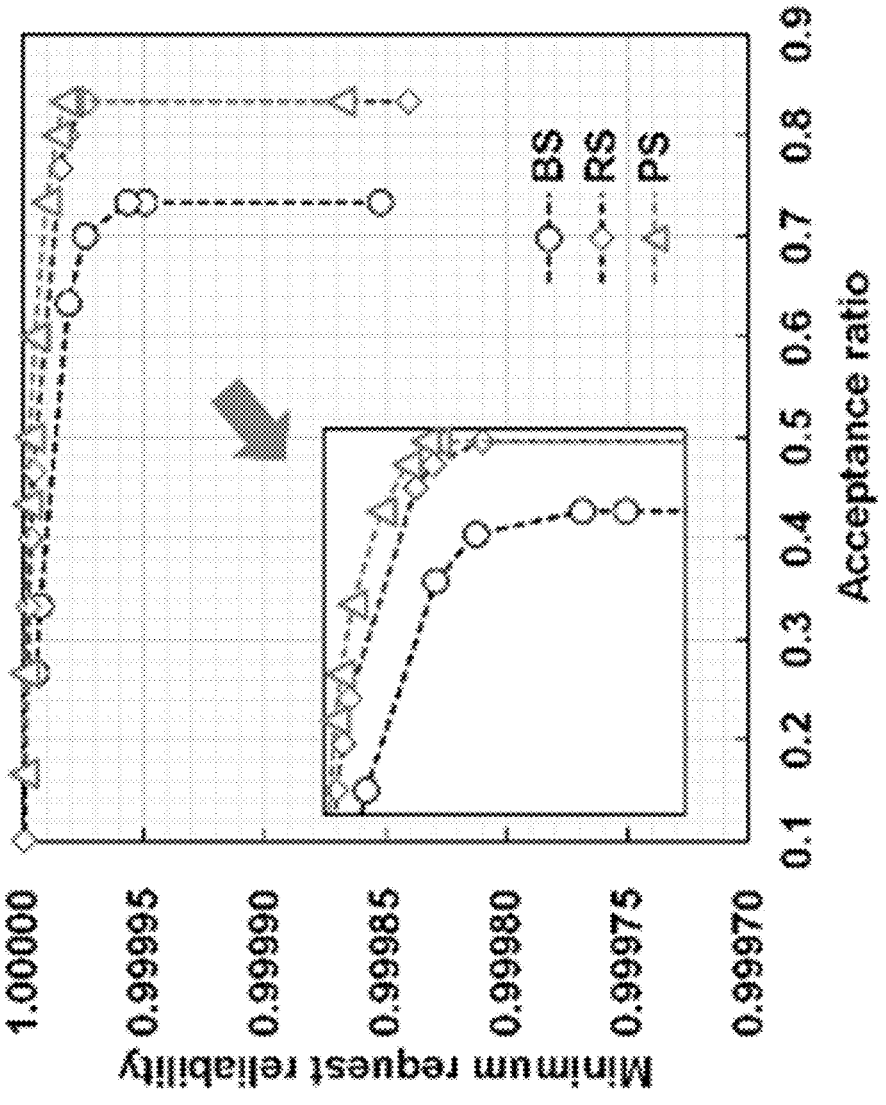
FIG. 8 is a plot showing Pareto fronts comparisons when the backup is applied to every hardware element.

The above results demonstrate that an imperfect network will offset the benefits of hardware disaggregation. Backup is an intuitive way to improve reliability performance, and FIG. 8 gives the results for the case extended from S3, where every blade and switch has a backup. The inventors observe from FIG. 8 that the results are very close to those in S1. This is reasonable as backup dramatically increases the reliability of switches and blades, making the performance very close to when the switches and blades are resilient.

However, backup is not an efficient approach, and it leads to increased costs. Next, the results in the dynamic scenario show that improved performance is achievable without backup. The inventors consider one pod consisting of 10 spine switches and 9 racks with 2 leaf switches, 48 blades per rack, and 3 components per blade. Other settings like the hardware capacity and request resource demand are the same as in the static scenario. Here the inventors do not consider the latency and bandwidth restrictions. The inventors simulate a dynamic system, including the events of request arrival, request departure, hardware (components, blades, and switches) failure, and hardware repair. The request arrival follows a Poisson process with an arrival rate of 1.5, and service time follows an exponential distribution with a mean of 1000. The TBF of each element follows the Weibull distribution with parameters the same as in the static scenario. The time to repair follows another exponential distribution with a mean of 1. With this setting, hardware availability ranges from 99.999% to 99.9999%, which is consistent with hardware availability in real-world DCs. In the simulation, the inventors assume that the interrupted requests are immediately restored after the scheduler decides where to migrate the service. The simulation time is 106.

Figure 9:
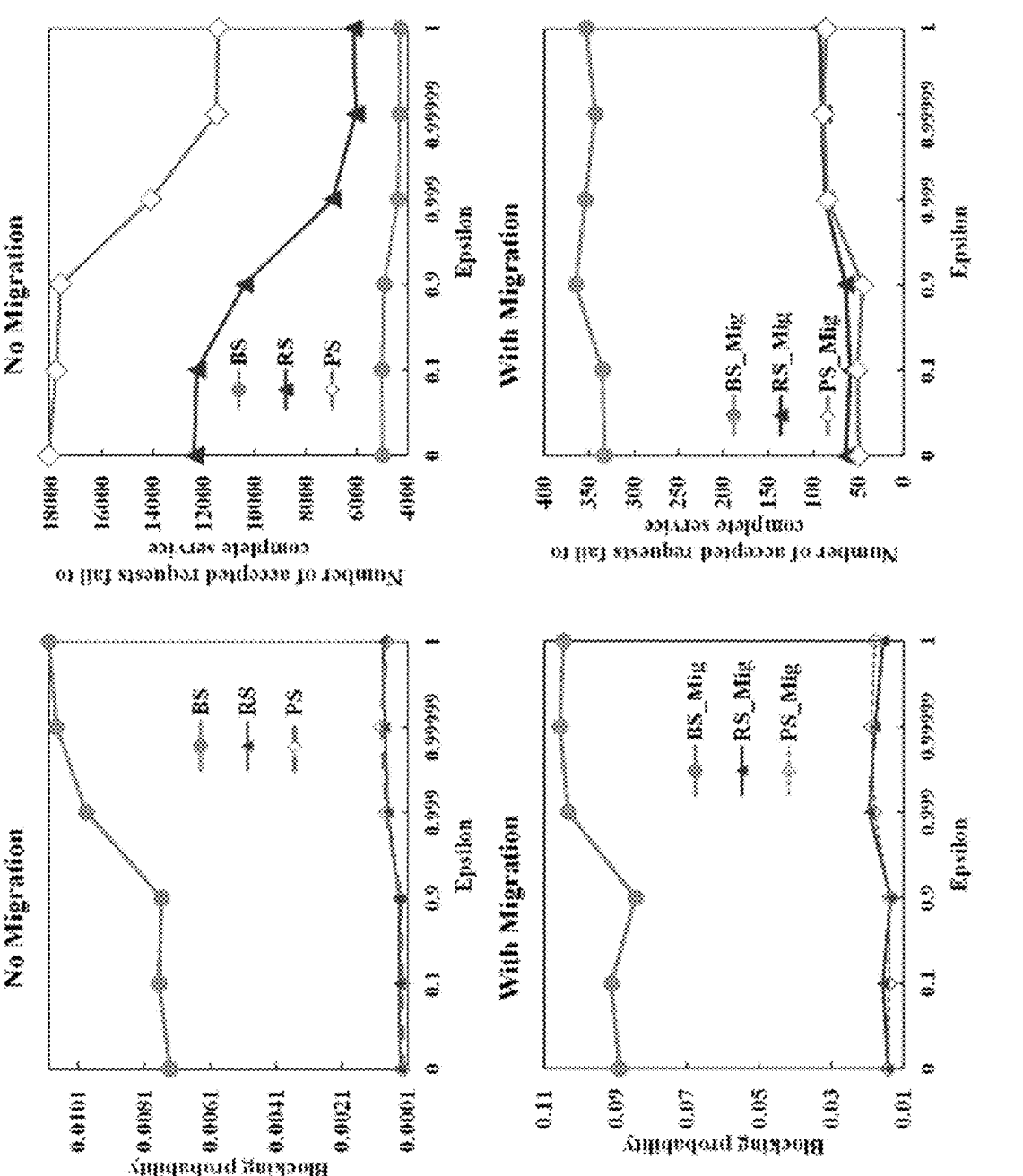
FIG. 9 are plots showing blocking probability and the number of requests failing to complete service with varying coefficients.

FIG. 9 gives the simulation results with varied weight coefficients. The first two subfigures give the results when migration is not applied. The inventors observe that the blocking probability of PS and RS are significantly lower than that of the BS. This is because of the significant efficiency benefit of hardware disaggregation. However, the second subfigure shows that, in terms of the number of accepted requests failing to complete service, PS has the highest value, second by RS and last by BS. The results further demonstrate that a vulnerable network may offset the benefits of disaggregation. The last two subfigures give the results when the migration is applied. The inventors observe that PS and RS outperform BS in both blocking probability and the number of accepted requests failing to complete service. The results demonstrate that the Radar framework can overcome the challenges created when the network is not resilient. Notice that in the static scenario, the inventors have demonstrated that the performance of PS is significantly affected by latency. Therefore, only the RS can overcome the challenges caused by an imperfect network when considering latency.

The inventors have studied service reliability in DDCs, considering network impact and different disaggregation scales. A MILP formulation and the Radar framework have been designed for the resource allocation in DDCs, considering both reliability and utilization aspects. The inventors have demonstrated that an imperfect network significantly offsets the improvement of resource efficiency and service reliability brought by hardware disaggregation. The results also demonstrate that hardware backup helps overcome such offset, which, however, may lead to increased cost. The Radar framework employs a migration-based restoration, which can also overcome the offset without backup. Numerical results have shown that the rack-scale architecture is currently the best option, as a larger disaggregation scale faces latency challenges, which may lead to severe performance deterioration.

DDC is a relatively new research area that gives rise to many research opportunities. In the following, the inventors consider the limitations of this work that lead to potential extensions and future research directions. Firstly, the inventors have assumed that the demand required by a request is always additive from multiple resource components. This may not be the case in certain applications, e.g., a task/ process should be executed on a single CPU component. Secondly, the service requests the inventors have considered is like a VM or a task, which requires multiple different resources to form one VM or complete one task. However, there are some applications, such as parallel computing, where multiple VMs are required to jointly complete multiple tasks for a single job. Such applications have not been considered in this disclosure. Thirdly, as discussed, the inventors have assumed no waiting room, and blocked requests are rejected without a re-allocation attempt. Finally, in response to "the trends of AI for cloud, fog, edge, serverless, and quantum computing" to improve automation in DCs, the inventors can study how to integrate AI tools like reinforcement learning with resource allocation in DDCs.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A server comprising:
a plurality of processing modules each having predetermined resources for processing tasks handled by the server, wherein the plurality of processing modules are interconnected by communication links forming a network of processing modules having a Disaggregated Data Centers (DDC) architecture;
a scheduler module for scheduling and migrating tasks based on hardware information associated with the processing modules;
a monitor module for detecting topology information and load changes, including failure and repair of processing modules, and report the topology information and load changes to the scheduler module;
a central processing unit (CPU) and a memory storing instructions that when executed by the CPU, cause the CPU to:
by the scheduler module:
detect hardware information associated with the network of processing modules during an operation of the server;
analyze a resource allocation requests associated with a plurality of tasks and the hardware information; and
provide, based on the detection and analysis, a scheduler decision, wherein providing a scheduler decision includes for each task, allocating more than one processing modules in the network to handle the task based on resource availability of the plurality of processing modules and minimizing the blocking probability and number of task failing to complete their service while optimizing physical inter-resource traffic paths based on inter-resource traffic demand among different processing modules involved in handling the respective task of the plurality of tasks, wherein the blocking probability is one minus an acceptance ratio; and
based on changes to the hardware information, modifying the scheduler decision to:

for each task affected by the received change, reallocating more than one processing modules in the network to handle the task based on resource availability of the plurality of processing modules that have not experienced a failure or have been repaired and optimizing physical inter-resource traffic paths based on inter-resource traffic demand among different processing modules involved in handling the respective task of the plurality of tasks;
by the monitor module:
monitor for changes associated with the hardware information, wherein the hardware information includes topology of the DDC architecture, loading of each of the plurality of processing modules, and information related to failure and/or repairing of the network of processing modules; and
based on detected changes associated with the hardware information, notifying the scheduler module of the changes to perform a modification to the scheduler decision.

2. The server in accordance with claim 1, wherein the central processing unit (CPU) is further caused to analyze multiple resource allocation requests in a static scenario where the resource allocation requests are serviced in batches.

3. The server in accordance with claim 2, wherein the central processing unit (CPU) is further caused to analyze the multiple resource allocation requests based on a mixed-integer linear programming (MILP) method.

4. The server in accordance with claim 3, wherein the mixed-integer linear programming (MILP) method includes solving a MILP problem with varied weights in an objective function associated with a single-objective problem with a weighted sum, wherein the single-objective problem is converted from a multi-objective problem associated with multiple resource allocation requests in the static scenario.

5. The server in accordance with claim 1, wherein the centrals processing unit (CPU) is further caused to analyze multiple resource allocation requests in a dynamic scenario where the resource allocation requests sequentially and each resource allocation request is served over a predetermined period of time.

6. The server in accordance with claim 5, wherein the centrals processing unit (CPU) is further caused to schedule the resource allocation requests arriving in the dynamic scenario, based on the following conditions:
accepting the resource allocation request if sufficient resources are available upon arrival of the request; or
blocking the resource allocation request such that the request leaves the system without re-attempting;
wherein the resources are provided by a single processing module or a group of two or more processing modules involving inter-resource traffic.

7. The server in accordance with claim 6, wherein the centrals processing unit (CPU) is further caused to restore an accepted request being interrupted by hardware failure associated with resources allocated for handling the task, by excluding the processing module with hardware failure from the topology of the DDC architecture, and re-allocating resources for handling the accepted request.

8. The server in accordance with claim 1, wherein each of the plurality of processing modules includes plurality components of different types of resources, and wherein a single task including a request of more than one resource type is arranged to be processed by components of different types of resources in the plurality of processing modules in a disaggregated manner.

9. A resource scheduling method for use in a server, wherein the server comprises a plurality of processing modules each having predetermined resources for processing tasks handled by the server, wherein the plurality of processing modules are interconnected by communication links forming a network of processing modules having a Disaggregated Data Centers (DDC) architecture; a scheduler module for scheduling and migrating tasks based on hardware information associated with the processing modules; and a monitor module for detecting topology information and load changes, including failure and repair of processing modules, and report the topology information and load changes to the scheduler module, the method comprising the steps of:

detecting, by the scheduler module, hardware information associated with the network of processing modules during an operation of the server;

analyzing, by the scheduler module, a resource allocation request a plurality of tasks and the hardware information; and providing, by the scheduler module, based on the detection and analysis, a scheduler decision, wherein providing a scheduler decision include for each task, allocating more than one processing modules in the network to handle the task based on resource availability of the plurality of processing modules and minimizing the blocking probability and number of task failing to complete their service while optimizing physical inter-resource traffic paths based on inter-resource traffic demand among different processing modules involved in handling the respective task of the plurality of tasks, wherein the blocking probability is one minus an acceptance ratio;

subsequent to the providing, monitoring, by the monitoring module, for changes associated with the hardware information, wherein the hardware information includes topology of the DDC architecture, loading of each of the plurality of processing modules, and information related to failure and/or repairing of the network of processing modules;

based on detected changes associated with the hardware information, notifying, by the monitoring module, the scheduler module of the changes to perform a modification to the scheduler decision; and based on changes to the hardware information, modifying the scheduler decision to: for each task affected by the received change, reallocating more than one processing modules in the network to handle the task based on resource availability of the plurality of processing modules that have not experienced a failure or have been repaired and optimizing physical inter-resource traffic paths based on inter-resource traffic demand among different processing modules involved in handling the respective task of the plurality of tasks.

10. The resource scheduling method in accordance with claim 9, wherein the step of analyzing the resource allocation request associated with each respective task and the hardware information comprising the step of analyzing multiple resource allocation requests in a static scenario where the resource allocation requests are serviced in batches.

11. The resource scheduling method in accordance with claim 10, wherein the multiple resource allocation requests are analyzed based on a mixed-integer linear programming (MILP) method.

12. The resource scheduling method in accordance with claim 11, wherein the mixed-integer linear programming (MILP) method includes solving a MILP problem with varied weights in an objective function associated with a single-objective problem with weighted sum, wherein the single-objective problem is converted from a multi-objective problem associated with multiple resource allocation requests in the static scenario.

13. The resource scheduling method in accordance with claim 9, wherein the step of analyzing the resource allocation request associated with each respective task and the hardware information comprising the step of analyzing multiple resource allocation requests in a dynamic scenario where the resource allocation requests are served sequentially and each resource allocation request is served over a predetermined period of time.

14. The resource scheduling method in accordance with claim 13, wherein the step of analyzing the resource allocation request associated with each respective task and the hardware information comprising the step of scheduling the resource allocation requests arriving in the dynamic scenario, based on the following conditions:

accepting the resource allocation request if sufficient resources are available upon arrival of the request; or blocking the resource allocation request such that the request leaves the system without re-attempting;

wherein the resources are provided by a single processing module or a group of two or more processing modules involving inter-resource traffic.

15. The resource scheduling method in accordance with claim 14, wherein the step of analyzing the resource allocation request associated with each respective task and the hardware information comprising the step of restoring an accepted request being interrupted by hardware failure associated with resources allocated for handling the task, by excluding the processing module with hardware failure from the topology of the DDC architecture, and re-allocating resources for handling the accepted request.

16. The resource scheduling method in accordance with claim 11, wherein each of the plurality of processing modules includes plurality components of different types of resources, and wherein a single task including a request of more than one resource type is arranged to be processed by components of different types of resources in the plurality of processing modules in a disaggregated manner.

* * * * *